US012800075B2

(12) United States Patent
Rosenwinkel

(10) Patent No.: US 12,800,075 B2
(45) Date of Patent: Nov. 17, 2026

(54) ADAPTIVE TILE COUPLING

(71) Applicant: A&E PLASTICS, INC., Hinckley, IL (US)

(72) Inventor: Timothy J. Rosenwinkel, Hinckley, IL (US)

(73) Assignee: A&E PLASTICS, INC., Hinckley, IL (US)

( * ) Notice: Subject to any disclaimer, the term of this patent is extended or adjusted under 35 U.S.C. 154(b) by 195 days.

(21) Appl. No.: 18/320,811

(22) Filed: May 19, 2023

(65) Prior Publication Data

US 2024/0159335 A1 May 16, 2024

Related U.S. Application Data

(60) Provisional application No. 63/418,788, filed on Oct. 24, 2022.

(51) Int. Cl.
*F16L 23/00* (2006.01)
*F16L 21/00* (2006.01)
*F16L 25/00* (2006.01)

(52) U.S. Cl.
CPC ........... *F16L 23/006* (2013.01); *F16L 21/002* (2013.01); *F16L 23/003* (2013.01); *F16L 25/0036* (2013.01); *F16L 25/0045* (2013.01); *F16L 25/0063* (2013.01)

(58) Field of Classification Search
CPC . F16L 21/002; F16L 25/0036; F16L 25/0045; F16L 25/0063; F16L 33/26; Y10S 285/903
USPC .......................................................... 285/903
See application file for complete search history.

(56) References Cited

U.S. PATENT DOCUMENTS 5,346,264 A * 9/1994 Law .................... F16L 25/0045 285/903
5,458,380 A * 10/1995 Kanao ................... F16L 21/065 285/903
6,254,145 B1 * 7/2001 Schwarz ............ F16L 37/0987 285/903
6,811,191 B2 * 11/2004 Mills .................. F16L 25/0045 285/409

(Continued)

FOREIGN PATENT DOCUMENTS

CA 2299696 A1 * 8/2001 .......... F16L 25/0045
DE 202014005766 U1 * 7/2014 .......... F16L 25/0045

(Continued)

*Primary Examiner* — Matthew Troutman
*Assistant Examiner* — Alexander T Rufrano
(74) *Attorney, Agent, or Firm* — NIXON PEABODY LLP

(57) ABSTRACT

An adaptive tile coupling includes male and female portions. The male portion includes a generally cylindrical section and an outwardly extending flange extending from the generally cylindrical section. The female portion is attached to or integrally formed with the male portion. The female portion includes first and second sections connected by a hinge. The first and second sections have a fastening mechanism. The first and second sections of the female portion move from an open position to a closed position to form a generally cylindrical shape. The generally cylindrical section of the male portion has a first diameter. The first and second sections of the female portion in the closed position have a second diameter. The second diameter is larger than the first diameter.

6 Claims, 23 Drawing Sheets

(56) References Cited

U.S. PATENT DOCUMENTS

| | | | | |
|---|---|---|---|---|
| 2005/0184524 | A1* | 8/2005 | Stravitz | F16L 21/002 |
| | | | | 285/903 |

FOREIGN PATENT DOCUMENTS

| | | | | |
|---|---|---|---|---|
| EP | 0528101 A1 | * | 2/1993 | H02G 3/0691 |
| EP | 1653583 A1 | * | 5/2006 | H02G 3/0691 |
| EP | 2495484 A1 | * | 9/2012 | F16L 25/0045 |

* cited by examiner

ADAPTIVE TILE COUPLING

CROSS-REFERENCE TO RELATED APPLICATION

This application claims priority to and benefit of U.S. Provisional Patent Application No. 63/418,788 filed Oct. 24, 2022, which is hereby incorporated by reference herein in its entirety.

FIELD OF THE INVENTION

The present invention relates generally to an adaptive tile coupling. More specifically, the adaptive tile coupling assist in draining liquid from, for example, agricultural areas.

BACKGROUND OF THE INVENTION

Drainage systems have been used to assist farmers in better managing field moisture conditions to optimize yields. In addition to new installations, existing drainage systems often need to be repaired. These existing drainage systems may be, for example, a plastic, clay or concrete drainage system. Many, if not most, of these existing drainage systems are many decades old and can be as old as a century. Most of the existing drainage systems are not compatible across manufacturers. For example, current manufacturers have their own specifications (outside diameter, crown height, pitch of ribs, etc.). This makes the repair time consuming and can result in a poor fit. This can be especially challenging when the existing systems utilize more than one manufacturer.

Additionally, this repair often leads to a larger area of pipe being exposed, which can result in a greater chance of the drainage systems buckling and collapsing. The longer labor time of digging a larger hole can also lead to groundwater rising inside the trench, which can potentially cause cave-ins of the soil sidewalls, leading to an increased safety risk to the workers.

It would be desirable to provide an adaptive tile coupling to overcome such problems.

SUMMARY

According to one aspect of the present disclosure, an adaptive tile coupling includes a male portion and a female portion. The male portion includes a generally cylindrical section and an outwardly extending flange extending from the generally cylindrical section. The female portion is attached to or integrally formed with the male portion. The female portion includes at least a first section and a second section. The first section and the second section are connected by a hinge. The first section has at least one fastening mechanism. The second section has at least one fastening mechanism. At least one of the first and second sections of the female portion is configured to move from an open position to a closed position to form a generally cylindrical shape. The at least one fastening mechanism of the first section and the at least one fastening mechanism of the second section assist in securing and maintaining the female portion in a closed position. The generally cylindrical section of the male portion has a first diameter. The first and second sections of the female portion in the closed position has a second diameter. The second diameter is larger than the first diameter.

According to a configuration of the above implementation, the female portion is attached to or integrally formed with the male portion at the outwardly extending flange.

According to another configuration of the above implementation, the male portion and the female portion are integrally formed.

According to a further configuration of the above implementation, the at least one fastening mechanism of the first section is a loop and the at least one fastening mechanism of the second section is a loop. Each of the loops forms an opening.

In a further aspect of the above implementation, the outwardly extending flange includes a recess formed therein. The recess assists in fitting with the female portion when the adaptive tile coupling is in the closed position.

In yet a further aspect of the above implementation, the generally cylindrical section forms a plurality of upwardly extending tabs. The plurality of upwardly extending tabs is configured to assist in securing the adaptive tile coupling during installation.

According to a configuration of the above implementation, the first section of the female portion includes a flap. The second section of the female portion may form a recess therein. The recess is configured to receive the flap.

According to a configuration of the above implementation, an edge of the female portion includes a lip.

According to a further configuration of the above implementation, one of the first and second portions of the female portion includes an adjustable latch to assist in holding the adaptive tile coupling in the closed position.

According to another aspect of the present disclosure, an adaptive tile coupling includes a male portion and a female portion. The male portion includes a generally cylindrical section and an outwardly extending flange extending from the generally cylindrical section. The female portion is attached to or integrally formed with the male portion. The female portion includes at least a first section, a second section and a third section. The first section and the second section are connected by a first hinge. The second section and the third section are connected by a second hinge. The first section has at least one fastening mechanism. The third section has at least one fastening mechanism. At least one of the first and third sections of the female portion are configured to move from an open position to a closed position to form a generally cylindrical shape. The at least one fastening mechanism of the first section and the at least one fastening mechanism of the third section assist in securing and maintaining the female portion in a closed position. The generally cylindrical section of the male portion has a first diameter. The first, second and third sections of the female portion in the closed position has a second diameter. The second diameter is larger than the first diameter.

According to a configuration of the above implementation, the female portion is attached to or integrally formed with the male portion at the outwardly extending flange.

According to another configuration of the above implementation, the male portion and the female portion are integrally formed.

According to a further configuration of the above implementation, the at least one fastening mechanism of the first section is a loop and the at least one fastening mechanism of the second section is a loop. Each of the loops forms an opening.

In a further aspect of the above implementation, the outwardly extending flange includes a recess formed therein. The recess assists in fitting with the female portion when the adaptive tile coupling is in the closed position.

In yet a further aspect of the above implementation, the generally cylindrical section forms a plurality of upwardly extending tabs. The plurality of upwardly extending tabs is configured to assist in securing the adaptive tile coupling during installation.

According to a configuration of the above implementation, the second section has an internal surface and an external surface. The internal surface of the second section is generally smooth.

According to another configuration of the above implementation, the third section of the female portion includes a flap. The first section of the female portion may form a recess therein. The recess is configured to receive the flap.

According to a configuration of the above implementation, an edge of the female portion includes a lip.

According to a further configuration of the above implementation, one of the first and second portions of the female portion includes an adjustable latch to assist in holding the adaptive tile coupling in the closed position.

According to a further aspect of the present disclosure, an adaptive tile coupling includes a first female portion, a second female portion, and a generally circular ring. The first female portion includes at least a first section and a second section. The first section and the second section of the first female portion are connected by a first hinge. The first section has at least one fastening mechanism. The second section has at least one fastening mechanism. The second female portion includes at least a third section and a fourth section. The third section and the fourth section of the second female portion are connected by a second hinge. The third section has at least one fastening mechanism. The fourth section has at least one fastening mechanism. The generally circular ring includes a first outwardly extending flange and a second outwardly extending flange. The first outwardly extending flange and the second outwardly extending flange are located at opposite ends of the generally circular ring. The first female portion abuts the first outwardly extending flange when the adaptive tile coupling is in a closed position and the second female portion abuts the second outwardly extending flange when the adaptive tile coupling is in a closed position. At least one of the first and second sections of the first female portion is configured to move from an open position to a closed position to form a generally cylindrical shape. The at least one fastening mechanism of the first section and the at least one fastening mechanism of the second section assist in securing and maintaining the first female portion in a closed position. At least one of the third and fourth sections of the second female portion is configured to move from an open position to a closed position to form a generally cylindrical shape. The at least one fastening mechanism of the third section and the at least one fastening mechanism of the fourth section assist in securing and maintaining the second female portion in a closed position.

According to a configuration of the above implementation, the adaptive tile coupling is integrally formed.

According to another configuration of the above implementation, the at least one fastening mechanism of the first section is a loop. The at least one fastening mechanism of the second section is a loop. The at least one fastening mechanism of the third section is a loop. The at least one fastening mechanism of the fourth section is a loop. Each of the loops forms an opening.

According to a further configuration of the above implementation, the first and second outwardly extending flanges include a respective recess formed therein. Each of the respective recesses assists in fitting with a respective one of the first and second female portions when the adaptive tile coupling is in the closed position.

In a further aspect of the above implementation, each of the respective first sections of the first and second female portions includes a flap. Each of the respective second sections of the first and second female portions may form a recess therein. Each of the recesses is configured to receive a respective one of the flaps.

According to yet another aspect of the present disclosure, an adaptive tile coupling includes a first female portion, a second female portion, and a generally circular ring. The first female portion includes at least a first section, a second section, and a third section. The first section and the second section of the first female portion are connected by a first hinge. The second section and the third section of the first female portion are connected by a second hinge. The first section has at least one fastening mechanism. The third section has at least one fastening mechanism. The second female portion includes a fourth section, fifth section, and a sixth section. The fourth section and the fifth section of the second female portion are connected by a third hinge. The fifth section and the sixth section of the second female portion are connected by a fourth hinge. The fourth section has at least one fastening mechanism. The sixth section has at least one fastening mechanism. The generally circular ring includes a first outwardly extending flange and a second outwardly extending flange. The first outwardly extending flange and the second outwardly extending flange are located at opposite ends of the generally circular ring. The first female portion abuts the first outwardly extending flange when the adaptive tile coupling is in a closed position and wherein the second female portion abuts the second outwardly extending flange when the adaptive tile coupling is in a closed position. At least one of the first and third sections of the first female portion are configured to move from an open position to a closed position to form a generally cylindrical shape. The at least one fastening mechanism of the first section and the at least one fastening mechanism of the third section assist in securing and maintaining the first female portion in a closed position. At least one of the fourth and sixth sections of the second female portion are configured to move from an open position to a closed position to form a generally cylindrical shape. The at least one fastening mechanism of the fourth section and the at least one fastening mechanism of the sixth section assist in securing and maintaining the second female portion in a closed position.

According to a configuration of the above implementation, the adaptive tile coupling is integrally formed.

According to another configuration of the above implementation, the at least one fastening mechanism of the first section is a loop. The at least one fastening mechanism of the second section is a loop. The at least one fastening mechanism of the third section is a loop. The at least one fastening mechanism of the fourth section is a loop. Each of the loops forms an opening.

According to a further configuration of the above implementation, the first and second outwardly extending flanges include a respective recess formed therein. Each of the respective recesses assists in fitting with a respective one of the first and second female portions when the adaptive tile coupling is in the closed position.

In a further aspect of the above implementation, each of the second sections of the first and second female portions has an internal surface and an external surface. The internal surface of the second section is generally smooth.

In yet a further aspect of the above implementation, each of the respective third sections of the first and second female portions includes a flap. Each of the respective first sections of the first and second female portions forms a recess therein. Each of the recesses is configured to receive a respective one of the flaps.

According to one method of the present disclosure, a section of piping is replaced. A section of existing piping is cut. The section of the existing piping is removed such that the remaining piping has a first open end and a second open end. A first adaptive tile coupling and a second adaptive tile coupling are provided. Each of the first and second adaptive tile couplings includes a male portion and a female portion. The male portion includes a generally cylindrical section and an outwardly extending flange extending from the generally cylindrical section. The female portion is attached to or integrally formed with the male portion. The female portion includes at least a first section, a second section, and a third section. The first section and the second section are connected by a first hinge. The second section and the third section are connected by a second hinge. A new section of piping is provided with a first end and a second end. The male portion of the first adaptive tile coupling is inserted into the first open end of the existing piping. The new section of piping is placed into the female portion of the first adaptive tile coupling. The first adaptive tile coupling is secured to the new section of piping including moving at least one of the first and third sections of the female portion of the first adaptive tile coupling from an open position to a closed position to form a generally cylindrical shape. The male portion of the second adaptive tile coupling is inserted into the second open end of the existing piping. The new section of piping is placed into the female portion of the second adaptive tile coupling. The second adaptive tile coupling is secured to the new section of piping including moving at least one of the first and third sections of the female portion of the second adaptive tile coupling from an open position to a closed position to form a generally cylindrical shape. The generally cylindrical section of the male portion has a first diameter. The first, second and third sections of the female portion in the closed position has a second diameter. The second diameter is larger than the first diameter.

According to a configuration of the above implementation, the new piping is T-shaped piping. The new piping may be a generally straight section.

According to another configuration of the above implementation, the steps of inserting, placing and securing the first and second adaptive tile couplings are performed in the absence of tools or accessories.

In a further aspect of the above implementation, each of the first and second adaptive tile couplings includes at least one fastening mechanism of the first section and the at least one fastening mechanism of the third section to assist in securing the first and second adaptive tile couplings to the new section of piping.

In yet a further aspect of the above implementation, the securing includes a plurality of tying mechanisms. The plurality of tying mechanisms may be zip ties, plastic ties, twist ties, string, rope or wire.

In yet a further aspect of the above implementation, the moving further includes moving both the first and third sections of the female portion of the first adaptive tile coupling from an open position to a closed position to form a generally cylindrical shape and wherein the moving further includes moving both the first and third sections of the female portion of the second adaptive tile coupling from an open position to a closed position to form a generally cylindrical shape.

The above summary is not intended to represent each embodiment or every aspect of the present invention. Additional features and benefits of the present invention are apparent from the detailed description and figures set forth below.

BRIEF DESCRIPTION OF THE DRAWINGS

Other advantages of the invention will become apparent upon reading the following detailed description and upon reference to the drawings in which.

Figure 1A:
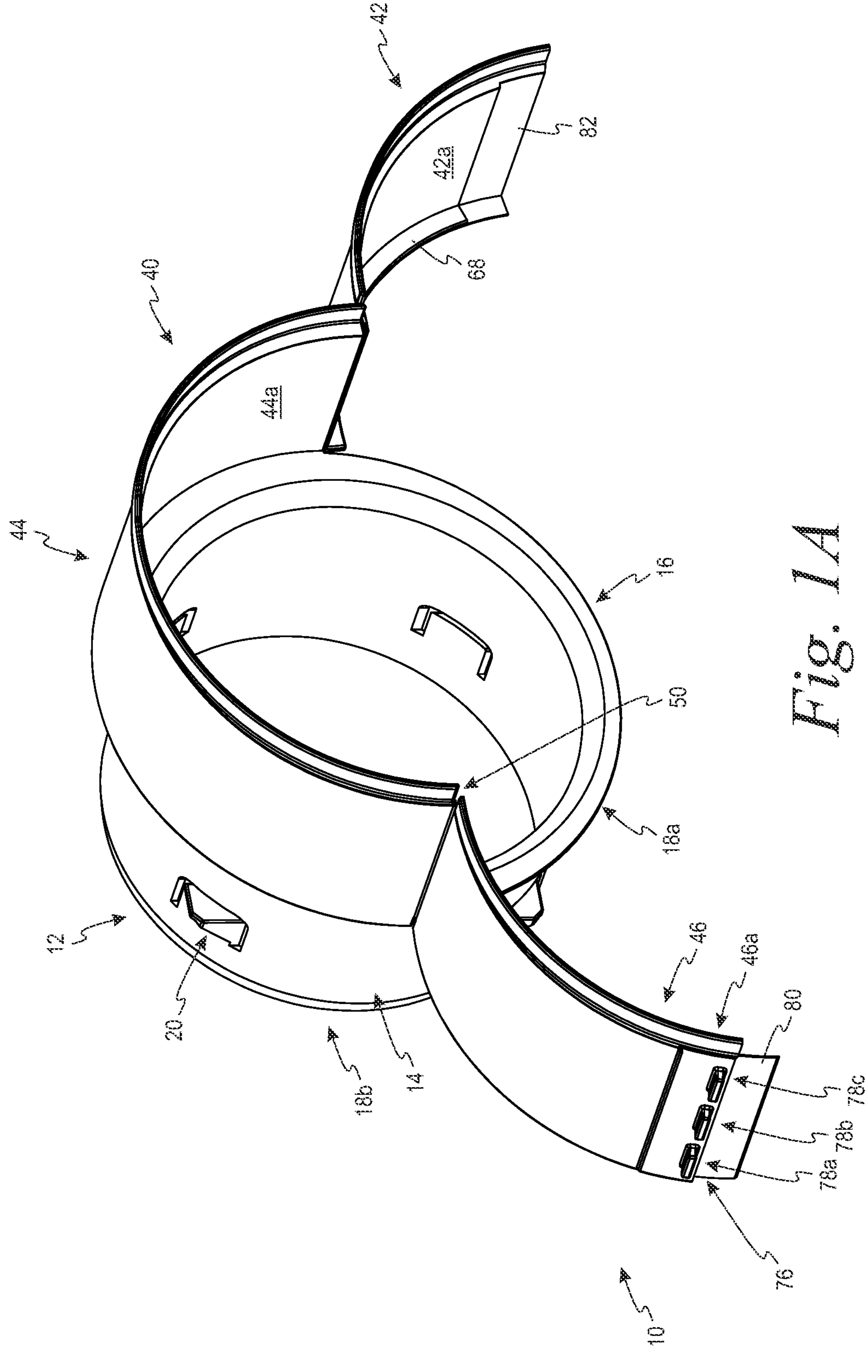
FIG. 1A is a front perspective view of an adaptive tile coupling in an open position according to one embodiment.
Figure 1B:
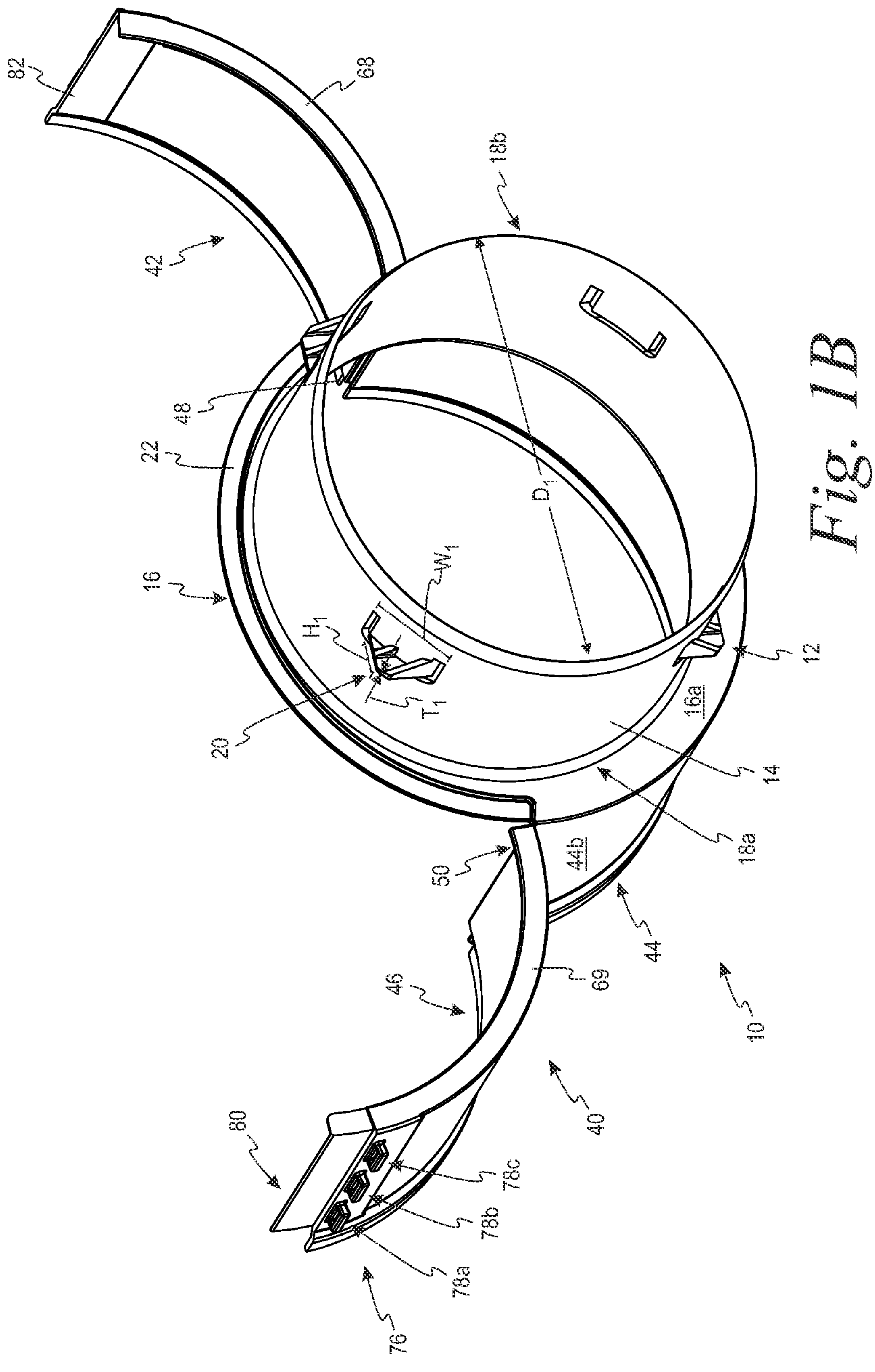
FIG. 1B is a back perspective view of the adaptive tile coupling of FIG. 1A in an open position.
Figure 1C:
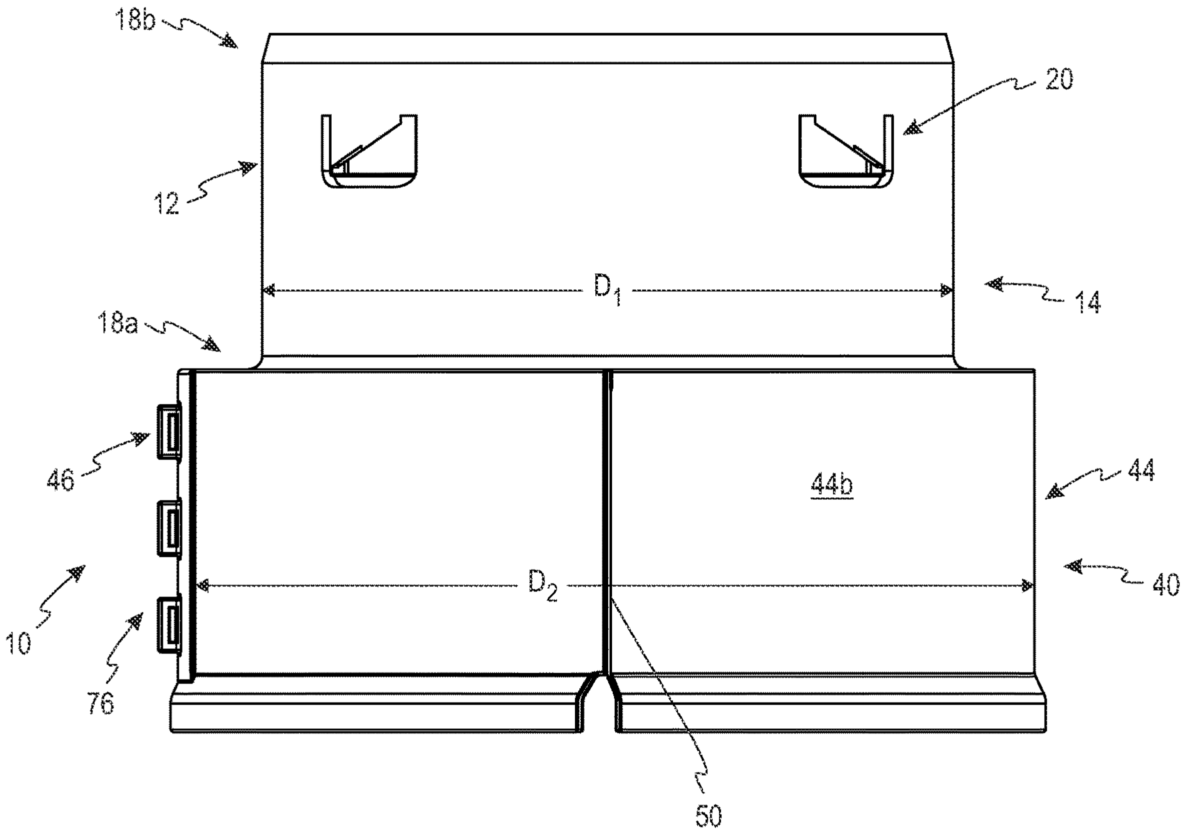
FIG. 1C is a side view of the adaptive tile coupling of FIG. 1A in a closed position.

While the invention is susceptible to various modifications and alternative forms, specific embodiments thereof have been shown by way of example in the drawings and will herein be described in detail. It should be understood, however, that it is not intended to limit the invention to the particular forms disclosed, but on the contrary, the intention is to cover all modifications, equivalents, and alternatives falling within the spirit and scope of the invention as defined by the appended claims.

DETAILED DESCRIPTION

FIGS. 1A-2B illustrate an adaptive tile coupling 10 according to one embodiment. The adaptive tile coupling 10 is configured to assist in drainage systems. One non-limiting example is a drainage system on a farm. The drainage systems assist farmers in better managing field moisture conditions to optimize yields. It is contemplated that the adaptive tile coupling may be used in locations that need drainage. The adaptive tile coupling assists in reducing time for repairing drainage systems, while still providing an improved and quality fit. The quicker repair time is accomplished by reducing the area of disruption beyond the new piping to be installed, which also reduces the chance of both existing and the newly installed piping from buckling and collapsing. Additionally, adaptive tile coupling also assists in installing new systems by reducing installation time by providing quicker and easier connections, while still providing an improved and quality fit. In new systems, the area of disruption is lessened, which reduces the chance of the newly installed piping from buckling and collapsing.

The adaptive tile coupling 10 includes a male portion 12 and a female portion 40. This particular configuration is an adaptive tile coupling for internal and external pipe coupling. In this embodiment, the male portion 12 and the female portion 40 of the adaptive tile coupling 10 is a singular integrated modular fitting.

The male portion 12 includes a generally cylindrical section 14 and an outwardly extending flange 16 extending from the generally cylindrical section 14. The outwardly flange 16 extends generally perpendicular from the generally cylindrical section 14. The outwardly flange 16 extends completely around an end 18*a* of the generally cylindrical section 14. It is contemplated that that outwardly extending flange may extend around less than the entire circumference of the end of the generally cylindrical section. The outwardly extending flange 16 as shown best in FIGS. 1B and 2B forms a recess 22. The recess 22 extends along a portion of an exterior surface 16*a* of the outwardly extending flange 16. As will be discussed below, the recess 22 assists in fitting with the female portion 40 when the adaptive tile coupling 10 is in the closed position.

At an end 18*b* of the generally cylindrical section 14, opposite of the end 18*a*, the generally cylindrical section 14 is tapered. The tapering of the end 18*b* assists in the installation process by making the insertion smoother. The generally cylindrical section 14 of the male portion 12 has a first diameter D1 (see FIG. 1).

Figure 2A:
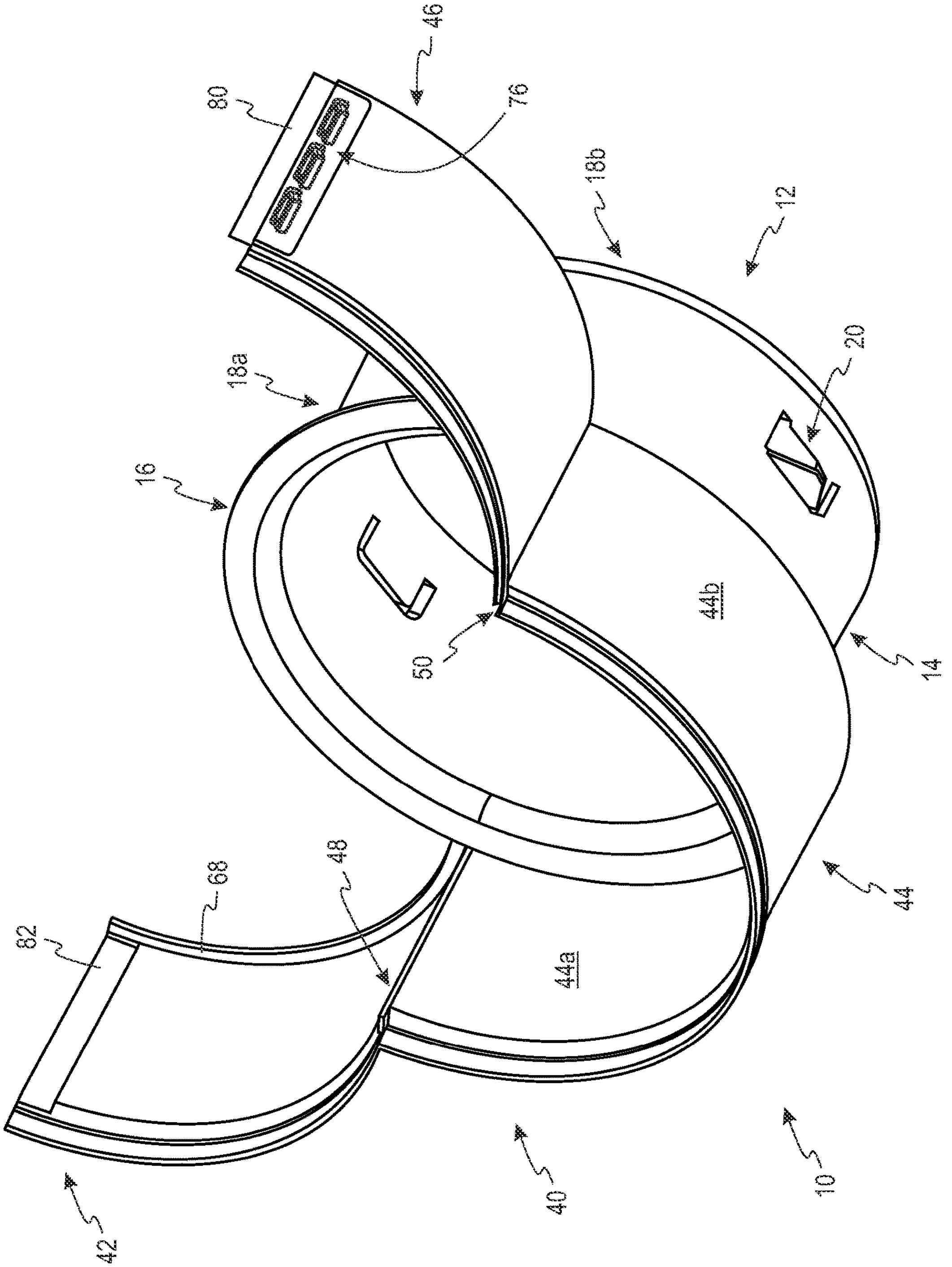
FIG. 2A is another front perspective view of the adaptive tile coupling of FIG. 1A in an open position.
Figure 2B:
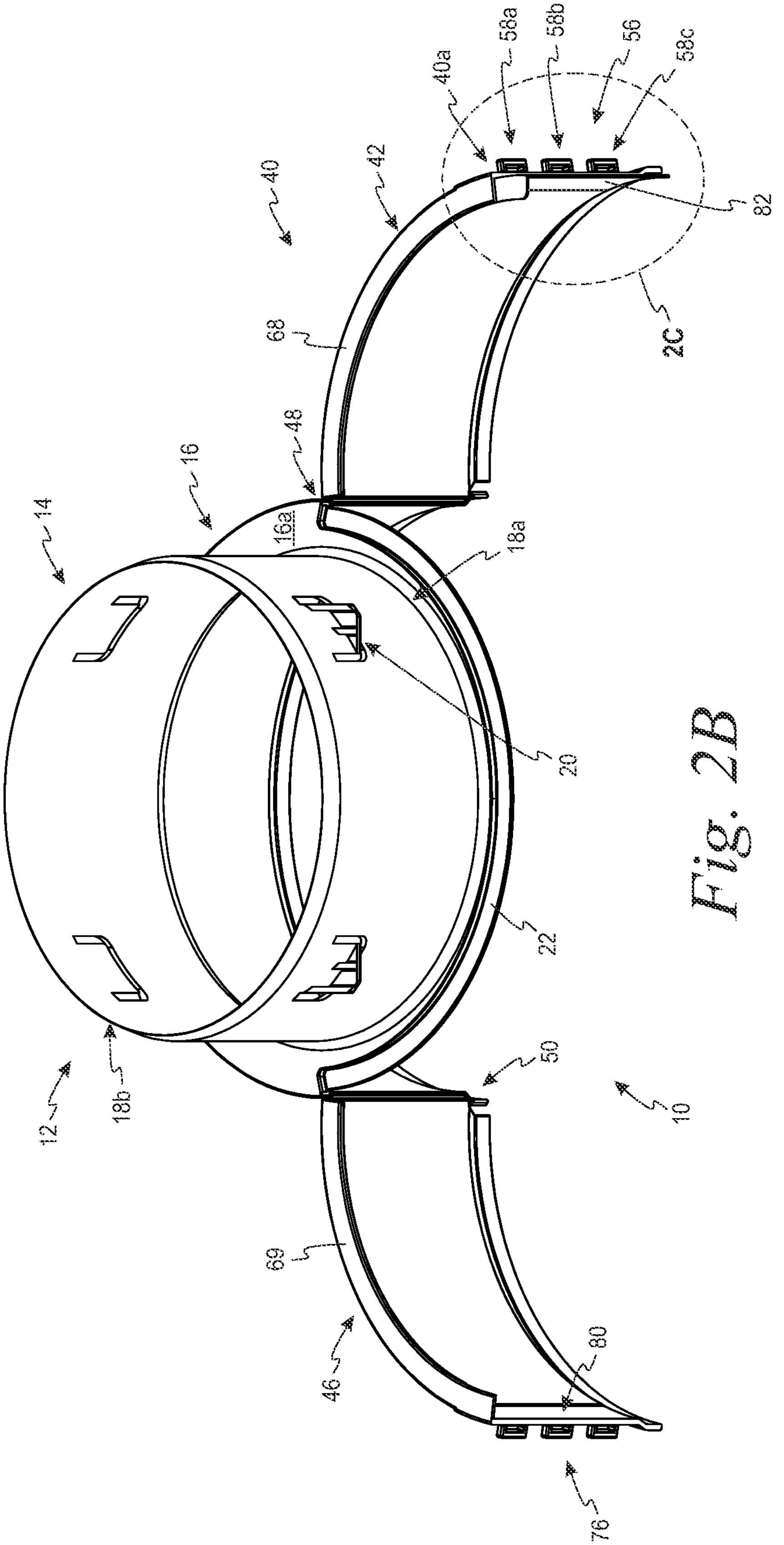
FIG. 2B is a back perspective view of the adaptive tile coupling of FIG. 1A in an open position.
Figure 2C:
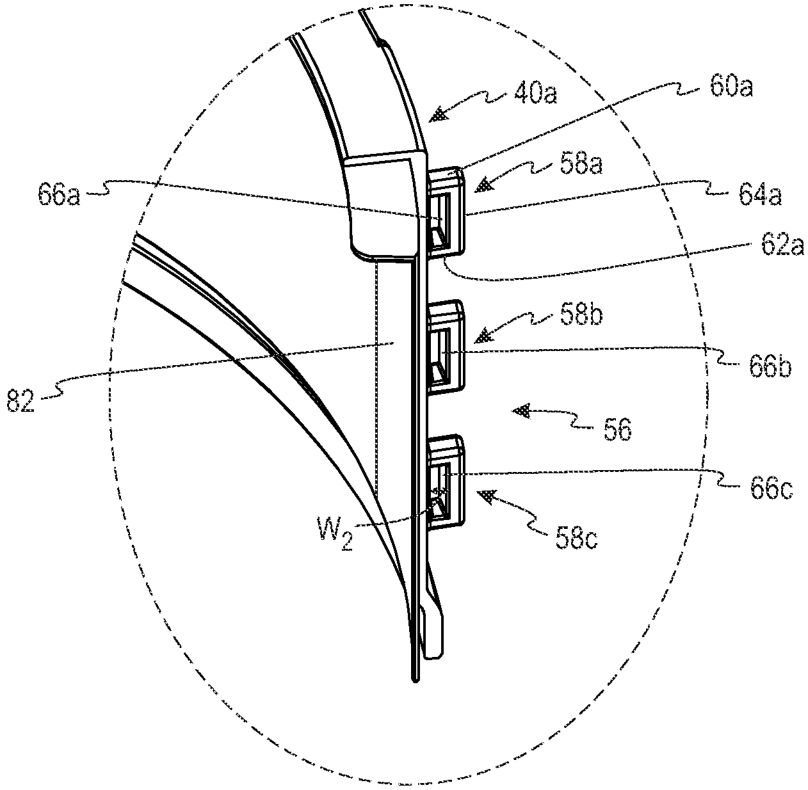
FIG. 2C is an enlarged view of the generally circular area 2C of FIG. 2B.

The generally cylindrical section 14 forms a plurality of upwardly extending tabs 20. The plurality of upwardly extending tabs extends from the remainder of the male portion 12. In this embodiment, there are exactly four upwardly extending tabs that are equally spaced around the generally cylindrical section 14 as shown in FIG. 2B. The plurality of upwardly extending tabs 20 is configured to extend into the corrugations of the existing piping to assist in securing the adaptive tile coupling 10 after installation. This prevents or inhibits undesired or unwanted movement of the adaptive tile coupling 10 with respect to the existing piping after installation. The plurality of upwardly extending tabs 20 is sized and shaped such that they are flexible and will bend to a certain degree when being installed into existing piping.

In one embodiment, the thickness T1 (see FIG. 1B) of each of the plurality of upwardly extending tabs 20 is from about 0.10 inch to about 0.20 inch. In another embodiment, the thickness T1 of each of the plurality of upwardly extending tabs 20 is from about 0.10 inch to about 0.15 inch. In one embodiment, the height H1 of each of the plurality of upwardly extending tabs 20 is from about 0.25 inch to about 1.0 inch. In another embodiment, the height H1 of each of the plurality of upwardly extending tabs 20 is from about 0.30 inch to about 0.90 inch and, more specifically, from about 0.40 inch to about 0.75 inch. In one embodiment, the width W1 of each of the plurality of upwardly extending tabs 20 is from about 1.0 inch to about 2.5 inches. In another embodiment, the width W1 of each of the plurality of upwardly extending tabs 20 is from about 1 inch to about 2 inches and, more specifically, from about 1.5 inches to about 2 inches.

The plurality of upwardly extending tabs 20 may be formed in one method by punching the material from the remainder of the generally cylindrical section 14. It is contemplated that more or less upwardly extending tabs 20 may be added to the adaptive tile coupling.

The female portion 40 is attached to or integrally formed with the male portion 12. As shown best in FIGS. 1A, 2B, the female portion 40 includes a first section 42, a second section 44, and a third section 46. The first section 42 and the second section 44 are connected by a first hinge 48. The second section 44 and the third section 46 are connected by a second hinge 50. The first section 42 includes a sidewall 68, while the third section 46 includes a sidewall 69. The sidewalls 68, 69 are integrally formed with the respective first and third sections 42, 46. The sidewalls 68, 69 are generally perpendicular to the remainders of the first and third sections 42, 46. The sidewalls 68, 69 are shaped and sized to fit into the recess 22 when the adaptive tile coupling is in a closed position.

The second section 42 includes an internal surface 44*a* and an external surface 44*b*. The internal surface 44*a* of the second section 44 is generally smooth or smooth in this embodiment. By having the second section being generally smooth, it assists in fitting with different piping regardless of the corrugation size and/or spacing formed on the piping. In other words, the second section can assist in closing and securing the piping without the need to match corrugations or ribs. It is contemplated, however, that the second section may be non-smooth (e.g., having corrugations) in other embodiments. Similarly, the internal surfaces of the first and third sections 42, 46 are also generally smooth or smooth in this embodiment. It is contemplated, however, that the first and third sections may be non-smooth (e.g., having corrugations) in other embodiments.

The first section 42 forms a fastening mechanism 56. The fastening mechanism 56 shown in FIG. 2B comprises a plurality of loops or bridges 58*a*-58*c*. The loops 58*a*-58*c* are shown as being enlarged in FIG. 2C. The loops 58*a*-58*c* are generally rigid. Each of the closed loops includes a first side wall, a second wall, and a top wall bridging the first and second side walls. For example, referring specifically to FIG. 2C, the loop 58*a* includes a first sidewall 60*a*, a second sidewall 62*a*, and a top wall 64*a* bridging the first and second sidewalls 60*a*, 62*a*. The exterior shape of loops 58*a*-58*c* is generally rectangular.

The first and second sidewalls 60*a*, 62*a* are attached to or integrally formed with an exterior surface 40*a* of the female portion 40. These attachments or formations result in an opening 66*a* formed between the first and second sidewalls 60*a*, 62*a*, the top wall 64*a*, and the exterior surface 40*a* of the female portion 40. As will be discussed below, the opening 66*a* is used to assist in securing the female portion 40 in a closed position (see FIG. 1C). More typically, a plurality of openings 66*a*-66*c* is used to assist in securing the female portion in a closed position. The size of the plurality of openings 66*a*-66*c* may vary. The width W2 of the plurality of openings 66*a*-66*c* is generally from 0.3 inch to about 0.5 inch.

Similarly, the third section 46 forms a fastening mechanism 76. The fastening mechanism 76 shown in FIGS. 1A, 1B comprises a plurality of loops or bridges 78*a*-78*c*. The loops 78*a*-78*c* are the same as described above with respect to the loops 58*a*-58*c*. It is contemplated that the loops in the third section may be different than those in the first section.

It is contemplated that the loops may be shaped and sized differently than shown in the loops 58*a*-58*c* and 78*a*-78*c* as long as they can perform the same functionality as those loops discussed above. For example, the loops may be an arched bridge such, as for example, a smooth semi-circle. It is contemplated that loops or bridges may be other polygonal or non-polygonal shapes that form an opening therethrough.

The first and third sections 42, 46 of the female portion 40 are configured to move from an open position (see, e.g., FIG. 1A) to a closed position (see FIG. 1C) to form a generally cylindrical shape. It is contemplated that exactly one of the sections may be configured to move in other embodiments to form a generally cylindrical shape. The fastening mechanism 56 of the first section 42 and the fastening mechanism 76 of the third section 46 assist in securing and maintaining the female portion 40 in a closed position. Referring back to FIG. 1C, the first, second and third sections of 42, 44 and 46 of the female portion 40 in the closed position has a second diameter D2. The second diameter D2 of the female portion 40 is larger than the first diameter D1 of the male portion 12.

The third section 46 of the female portion 40 includes a flap or under flap 80. The flap 80 is located at an end 46*a* of the third section 46. The functionality of the flap 80 is to assist in surrounding piping that may vary a bit (e.g., varying outside diameters of same trade sized piping) between manufacturers or products. The flap 80 assists in preventing or inhibiting dirt from entering into an interior of the adaptive tile coupling 10 when in a closed position. On an interior surface 42*a* of the first section 42, a recess or undercut 82 is formed. The recess 82 is sized and shaped to generally correspond with the size and shape of the flap 80. The recess 82 does not desirably extend through the first section 42. As will be discussed below, the flap 80 may be positioned in the recess 82 when the female portion 40 is in a closed position.

Figure 8:
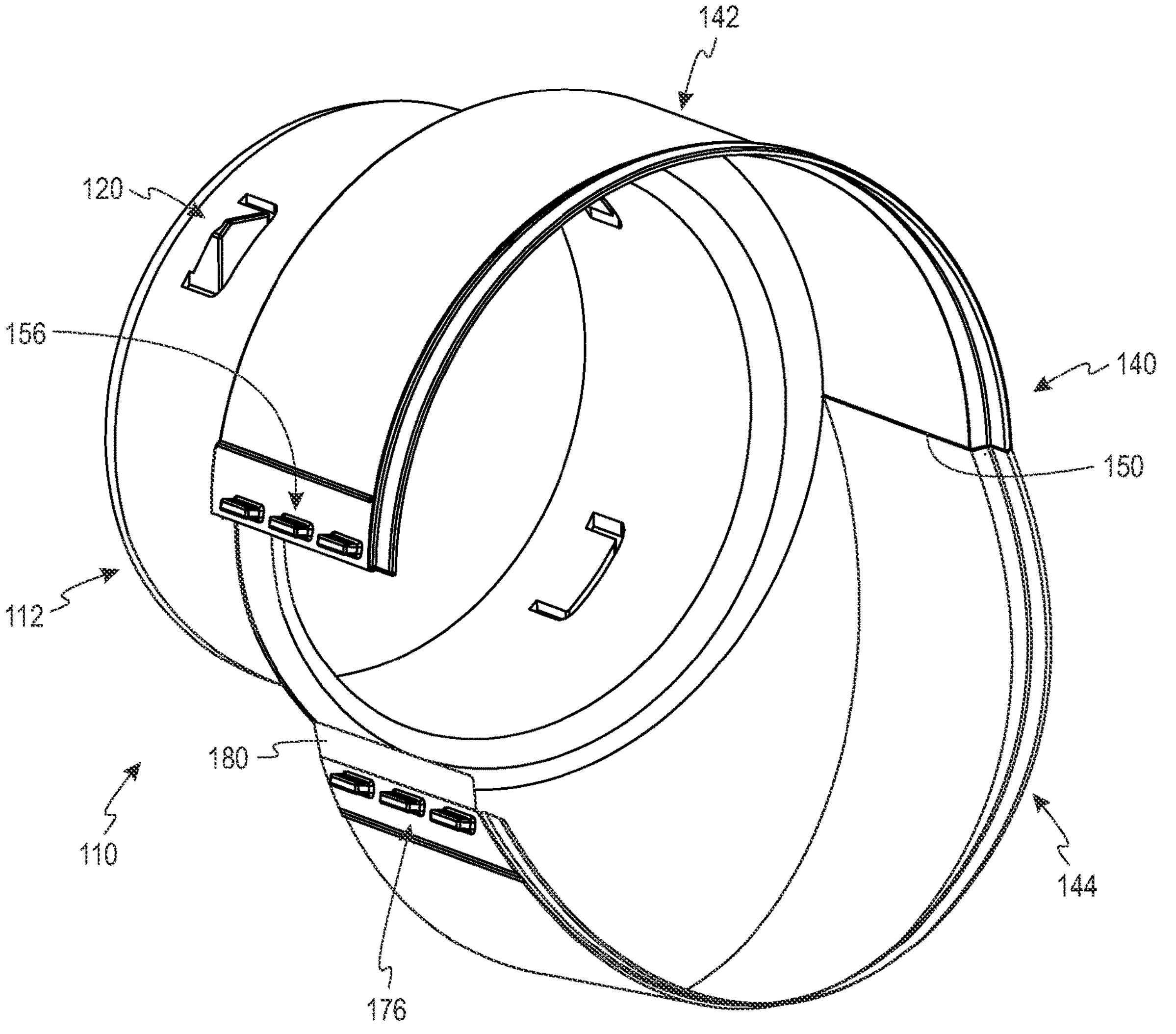
FIG. 8 is a front perspective view of an adaptive tile coupling according to another embodiment.

It is contemplated that instead of the three sections of the female portion 40 of the adaptive tile coupling 10 shown in the embodiment of FIGS. 1A-2B, more or less sections may be used in forming the female section. For example, FIG. 8 shows an adaptive tile coupling 110 that includes a male portion 112 and a female portion 140. The male portion 112 includes a plurality of upwardly extending tabs 120.

The female portion 140 includes exactly two sections—a first section 142 and a second section 144. The first section 142 and the second section 144 are attached to each other via a hinge 150. The first section 142 includes a fastening mechanism 156. The second section 144 includes a fastening mechanism 176 and a flap or outer flap 180. The adaptive tile coupling 110 functions in a similar manner as described above with the adaptive tile coupling 10, except that there is one less section and one less hinge in the female portion. It is contemplated that four or more sections may be used in forming an adaptive tile coupling in other embodiments. It is also contemplated that other variations of the sections may be formed in the female portions. For example, a two sectioned female portion may have both sections that may be moved. It is contemplated that the sections may be sized differently.

Figure 3A:
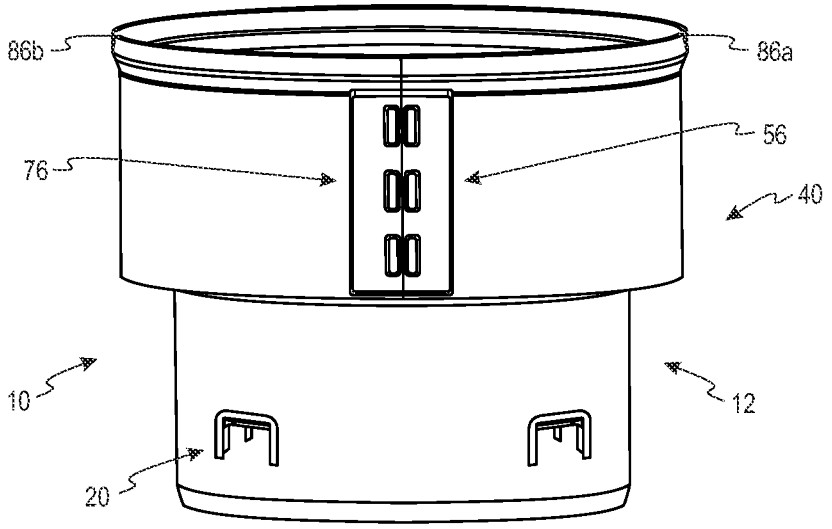
FIG. 3A is a side view of the adaptive tile coupling of FIG. 1A in a closed position in one embodiment.
Figure 3B:
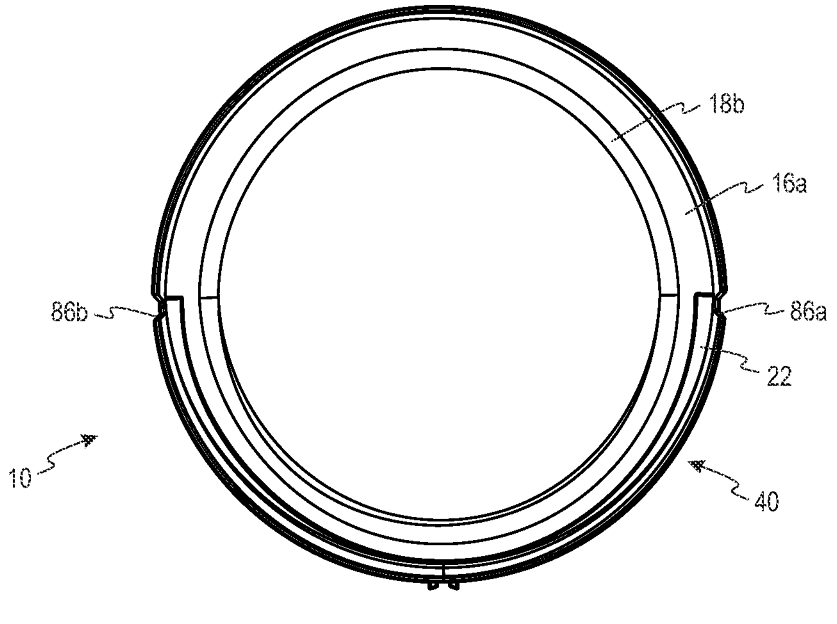
FIG. 3B is a front view of the adaptive tile coupling of FIG. 3A in the closed position.
Figure 3C:
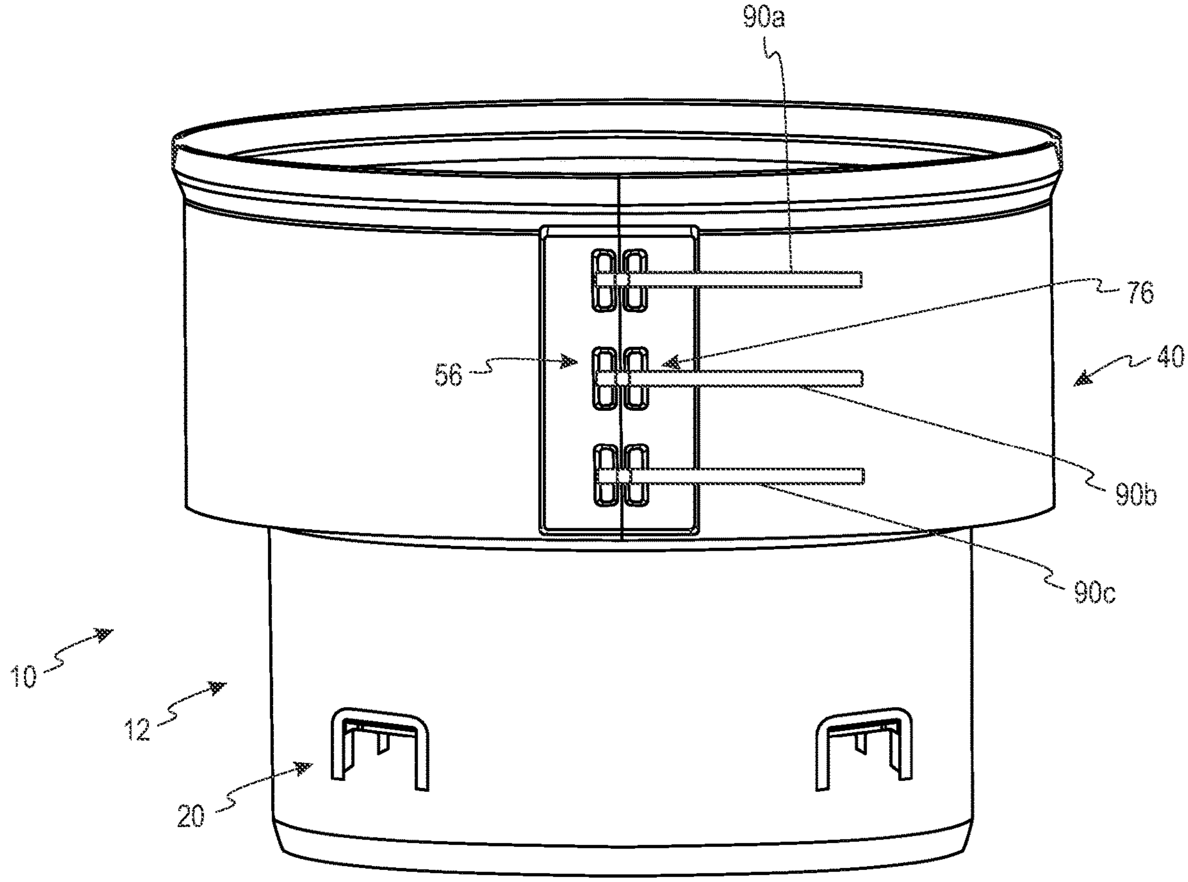
FIG. 3C is a side view of the adaptive tile coupling of FIG. 3A in a closed positon secured with a plurality of tying mechanisms (e.g., plastic ties).

Referring to FIGS. 3A-3C, one example of the adaptive tile coupling 10 in a closed position is shown. FIG. 3A is a side view of the adaptive tile coupling 10 in a closed position; FIG. 3B is a front view of the adaptive tile coupling 10 in a closed position; and FIG. 3C is a side view of the adaptive tile coupling 10 in a closed positon secured with a plurality of tying mechanisms (e.g., plastic ties).

FIGS. 3A-3C is a closed embodiment where the flap 80 is positioned entirely within the recess 82. This position would typically be achieved if the piping was a bit smaller or exactly the same size as traditional manufactured. The adaptive tile coupling 10 when in a closed position forms notches 86*a*, 86*b* that assist in moving the adaptive tile coupling between closed and open positions.

FIG. 3C shows a side view of the adaptive tile coupling 10 in a closed position using a plurality of tying mechanisms 90*a*-90*c*. The tying mechanisms 90*a*-90*c* are used to secure and maintain the adaptive tile coupling 10 in a closed position. The tying mechanisms 90*a*-90*c* may be, for example, zip ties, plastic ties, twist ties, string, rope or wire.

Figure 4A:
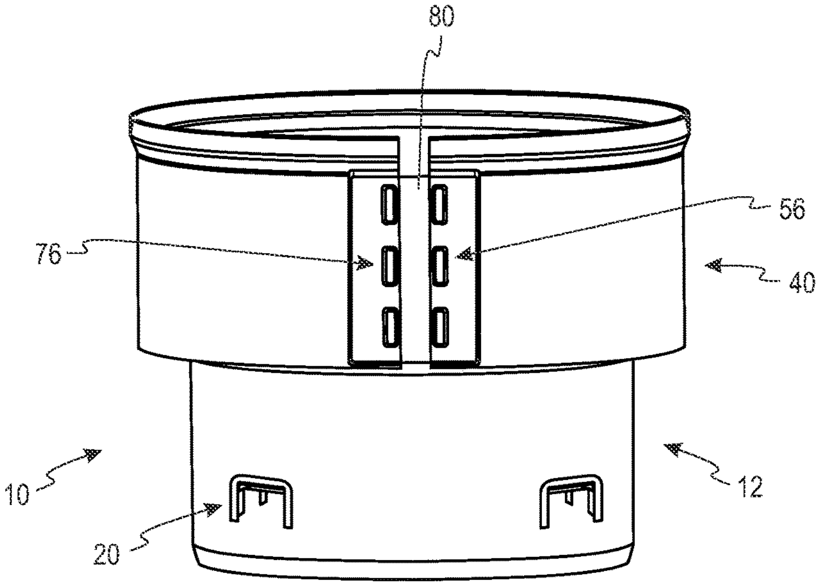
FIG. 4A is a side view of the adaptive tile coupling of FIG. 1A in a closed positon in another embodiment.
Figure 4B:
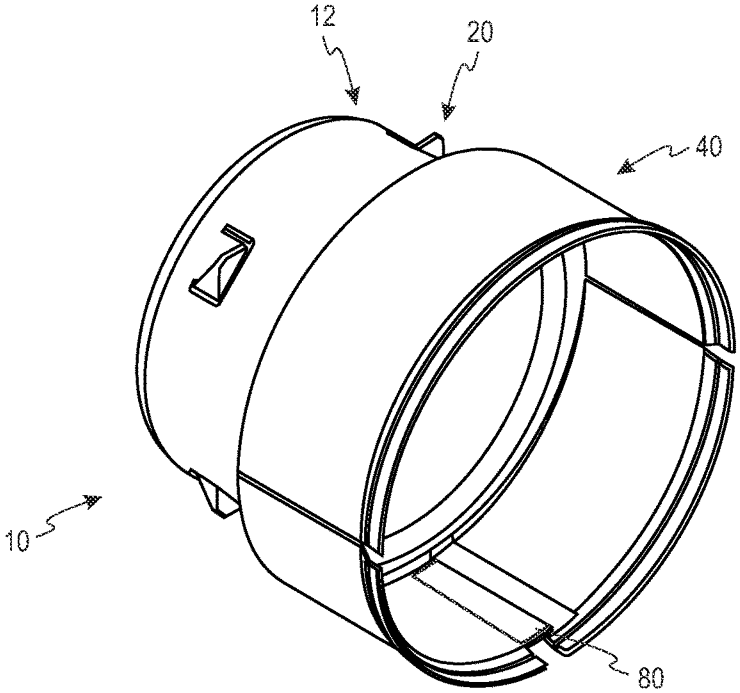
FIG. 4B is a front perspective view of the adaptive tile coupling of FIG. 4A in the closed position.
Figure 4C:
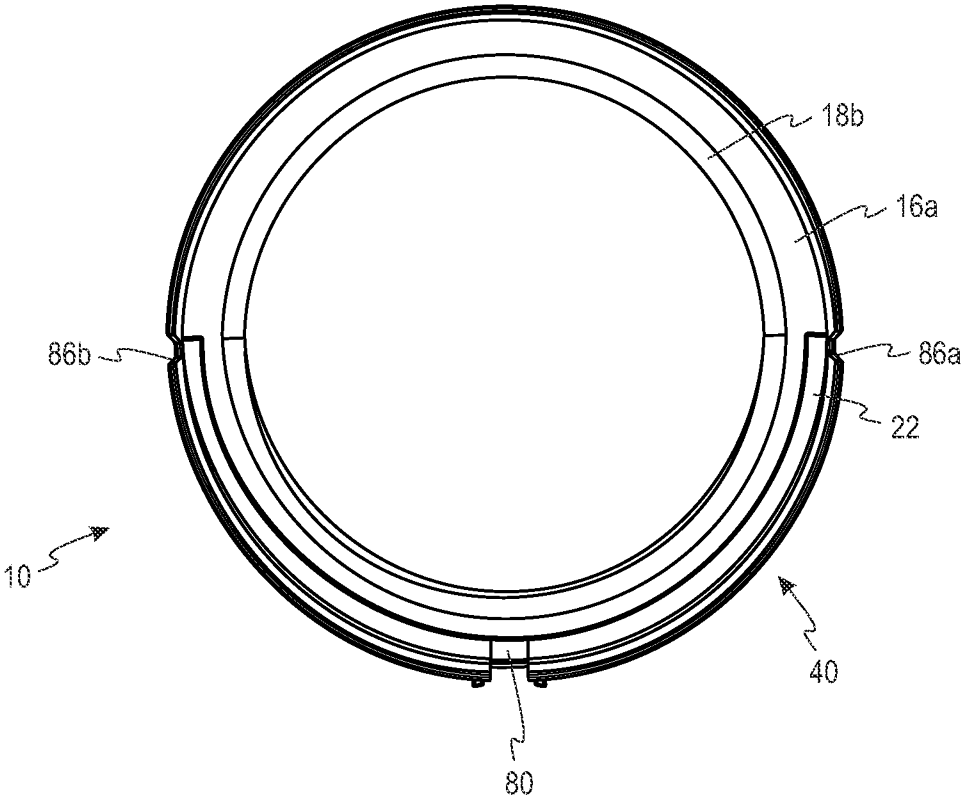
FIG. 4C is a front view of the adaptive tile coupling of FIG. 4A in the closed position.

Referring to FIGS. 4A-4C, additional views of the adaptive tile coupling 10 in a closed position are shown. FIG. 4A is a side view of the adaptive tile coupling 10 in a closed position; FIG. 4B is a front perspective view of the adaptive tile coupling of FIG. 4A in the closed position; and FIG. 4C is a front view of the adaptive tile coupling of FIG. 4A in the closed position. This is a closed embodiment where the flap 80 is not positioned within the recess 82. This position would be typically achieved if the piping was a bit larger than traditional sizing.

The adaptive tile coupling 10 may be made of different materials. Non-limiting examples of material that may form the adaptive tile coupling include polymeric or metallic materials. Some polymeric materials that can form the adaptive tile coupling include, but are not limited to, polyolefins. Some non-limiting examples of polyolefins that may be used are polyethylenes (e.g., high density polyethylene (HDPE)).

The adaptive tile coupling 10 may be formed by molding in one method. In one method, the adaptive tile coupling 10 is formed by injection molding. It is contemplated that the adaptive tile coupling may be formed by other methods.

The adaptive tile coupling 10 may be of different shapes and sizes including length and diameter. The diameters of the adaptive tile coupling can vary but generally are from about 6 inches to about 15 inches. Some more common and non-limiting examples of diameters of the adaptive tile coupling include 6 inch, 8 inch, 10 inch, 12 inch, and 15 inch. The length of the adaptive tile coupling is typically from about 6 to about 20 inches, and more commonly from about 6 to about 12 inches, or from about 6 to about 10 inches.

Figure 5A:
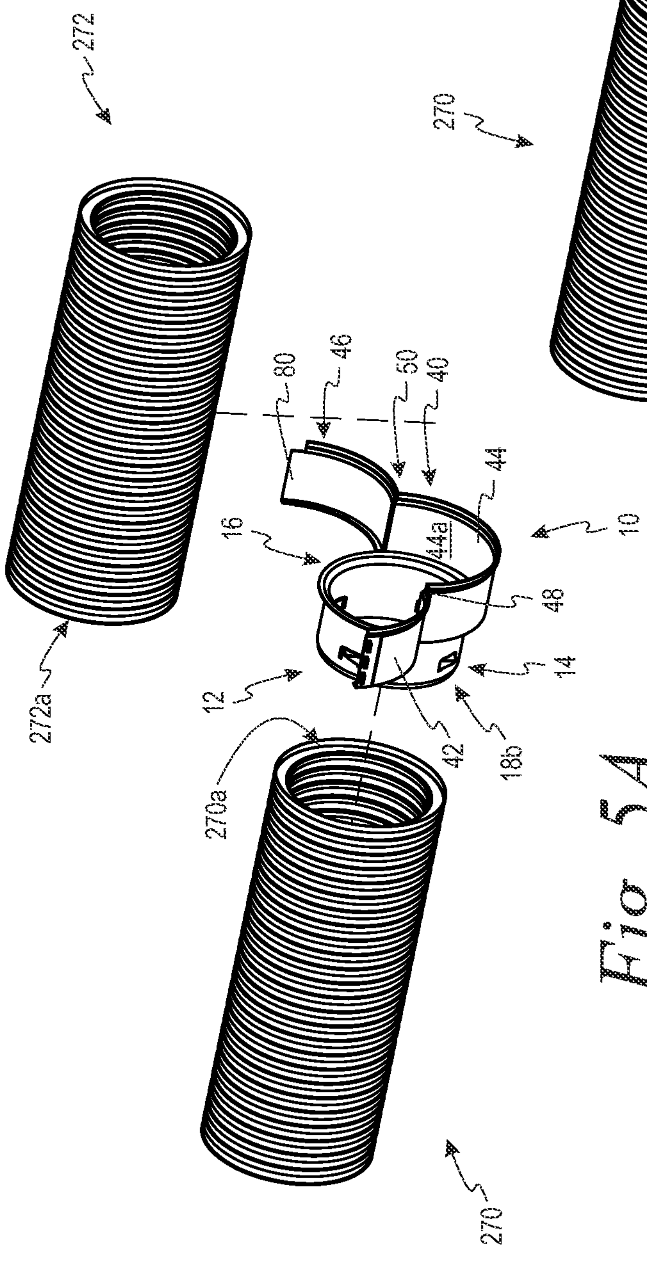
FIG. 5A is a side perspective view of the adaptive tile coupling of FIG. 1A in the process of being installed with two sections of piping according to one process.
Figure 5B:
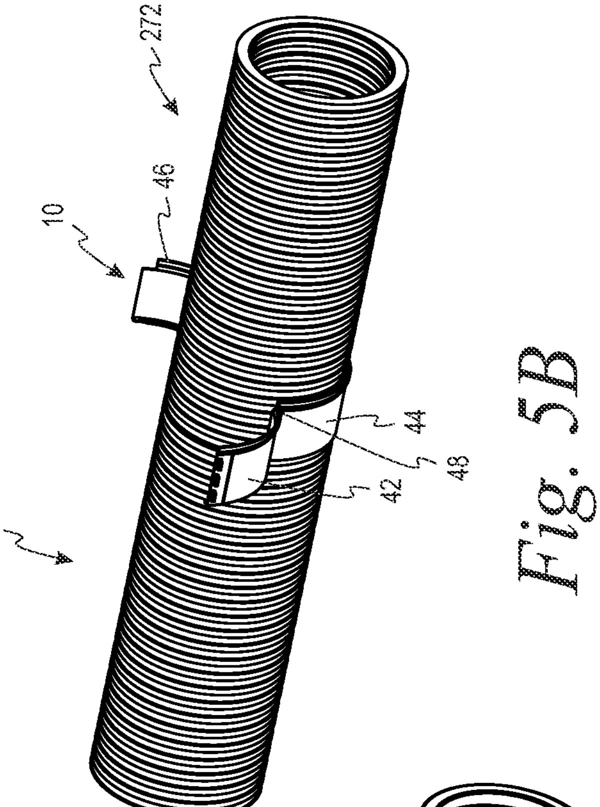
FIG. 5B is a side perspective view of the adaptive tile coupling of FIG. 1A in an open position after being installed with two sections of piping.
Figure 5C:
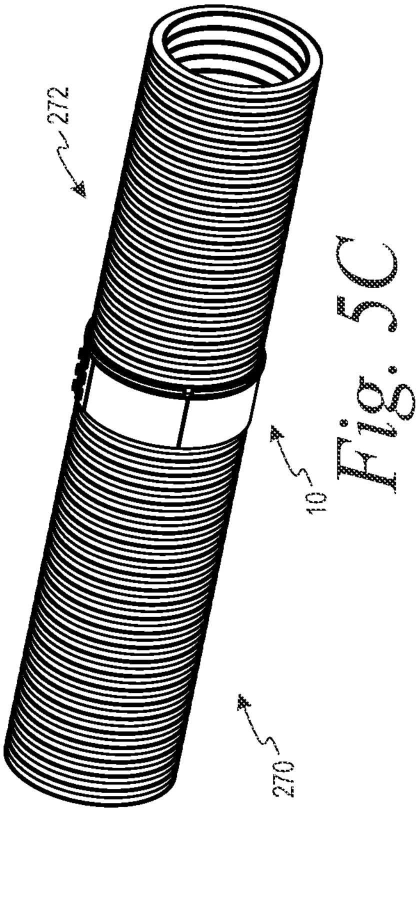
FIG. 5C is a side perspective view of the adaptive tile coupling of FIG. 1A in a closed position after being installed with two sections of piping.

Referring to FIGS. 5A-5C, a method of placing the adaptive tile coupling 10 into two different sections of piping is shown. The adaptive tile coupling 10 is configured for an internal/external pipe attachment. As will be discussed below, the male portion 12 of the adaptive tile coupling 10 is for an internal pipe attachment, while the female portion 40 of the adaptive tile coupling is for an external pipe attachment.

Referring specifically to FIG. 5A, the male portion 12 of the adaptive tile coupling 10 is inserted into piping 270. Specifically, the end 18*b* of the generally cylindrical portion 14 is moved and inserted into an opening 270*a* formed in the piping 270. A user continues to insert the male portion 12 into the opening 270*a* until the outwardly extending flange 16 abuts against an end forming the opening 270*a* of the piping 270.

The female portion 40 is configured to receive piping 272. The piping 272 is generally straight or horizontal piping. More specifically, the piping 272 is placed or located on the internal surface 44*a* of the second section 44 of the female portion 40. The female portion 40 is in an open position. An end 272*a* of the piping 272 is then moved or placed against the outwardly extending flange 16 of the male portion 12.

FIG. 5B shows the adaptive tile male portion 12 after being inserted into the piping 270 and the female portion 40 after having received the piping 272. The first and third section 42, 46 are then rotated inwardly via respective hinges 48, 50 such that the adaptive tile coupling 10 is in a closed position. A user may add a plurality of tying mechanisms (such as shown in FIG. 3C) through the openings formed in the respective loops 58*a*-58*c* and 78*a*-78*c* to secure and maintain the adaptive tile coupling 10 in a closed position.

It is contemplated that in this method of FIGS. 5A-5C, T-shaped piping or wye shape piping may be used instead of generally straight piping (e.g., piping 272).

Figure 6A:
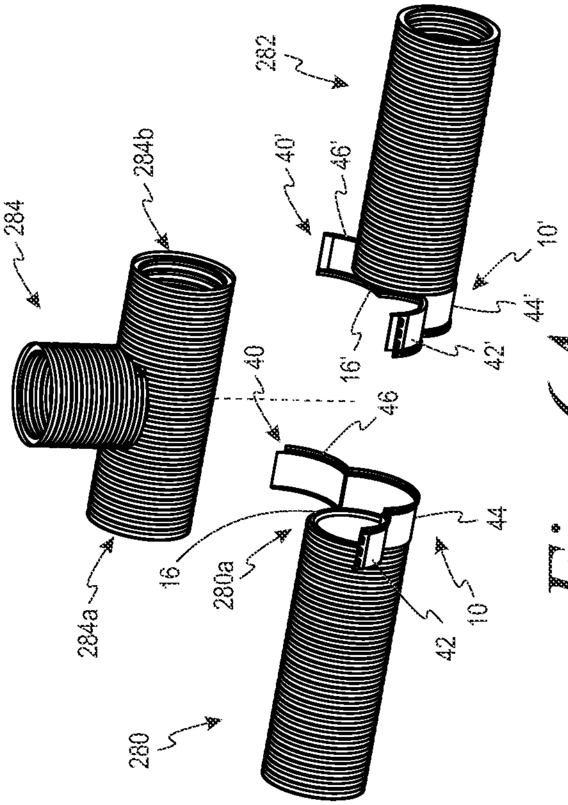
FIG. 6A are side perspective views of two adaptive tile couplings of FIG. 1A in the process of being installed with three sections of piping according to one process.
Figure 6B:
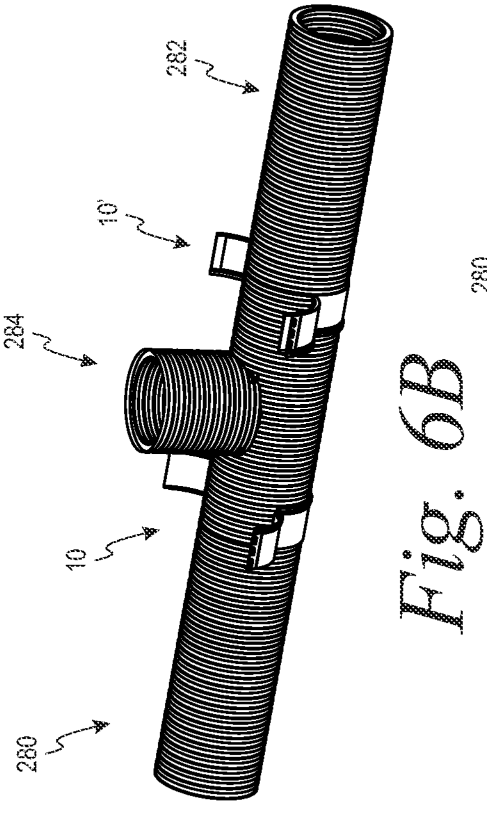
FIG. 6B are side perspective view of the two adaptive tile couplings of FIG. 6A in an open position after being installed with three sections of piping.
Figure 6C:
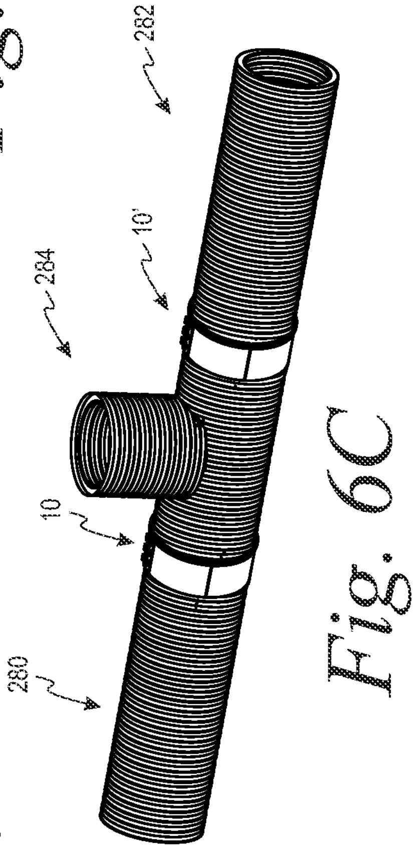
FIG. 6C are side perspective views of the two adaptive tile couplings of FIG. 6A in a closed position after being installed with three sections of piping.

Referring to FIG. 6A-6C, a method of placing the adaptive tile couplings 10, 10' with three different sections of piping is shown. The adaptive tile coupling 10' is identical to the adaptive tile coupling 10 discussed above. Referring specifically to FIG. 6A, the male portion 12 of the adaptive tile coupling 10 has already being inserted into the piping 280. Specifically, the end 18*b* of the generally cylindrical portion 14 has been moved and inserted into an opening formed in the piping 280. A user continues to insert the male portion 12 into the opening until the outwardly extending flange 16 abuts against an end 280*a* of the piping 280. Similarly, the adaptive tile coupling 10' has been inserted into piping 282 via its male portion.

Figure 7:
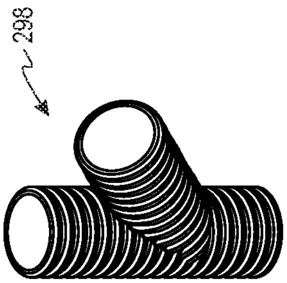
FIG. 7 is a wye piping according to one embodiment.

The female portion 40 of the adaptive tile coupling 10 is in an open position. Similarly, the female portion 40' of the adaptive tile coupling 10' is in an open position. Piping 284 is placed or located on respective interior surfaces of the second sections of the female portions 40, 40'. Respective ends 284*a*, 284*b* of the piping 284 are placed against the outwardly extending flanges 16, 16' of respective adaptive tile coupling 10, 10'. The piping 284 is T-shaped piping. It is contemplated that in this method of FIGS. 6A-6C, straight piping or wye piping 298 of FIG. 7 may be used instead of T-shaped piping.

FIG. 6B shows the male portions after being inserted into the respective piping 280, 282 and the female portions 40, 40' after having received the respective ends 284*a*, 284*b* of the piping 284. The respective first and third sections 42, 42', 46, 46' are then rotated inwardly via respective hinges such that the adaptive tile couplings 10, 10' are in closed positions. A user may add a tying mechanism such as described above through the openings formed in the respective loops to secure and maintain the adaptive tile couplings in closed positions. These methods of installing piping may be used in existing drainage system such as, for example, a plastic, clay or concrete drainage system.

The method is advantageous is that an individual typically only needs to dig in the general area where the existing piping is to be removed. This undesired or unwanted piping is typically a section where leakage is occurring. The undesired or unwanted piping may have a pinhole or crack that leaks or potential blockage at that location. This area or trench includes sufficient space to cut and remove the undesired or unwanted section piping. Alternatively, the method may be used in a random location selected to open up an existing main tile drain to splice in piping (e.g., a connection tee) so as to add an additional tile drain lateral/sub main pipe in the field.

In this method, there desirably is little to no movement of the existing piping. Thus, the remaining adjacent piping desirably remains embedded at all times. This can be referred to as drop-in piping since the existing piping remains undisturbed. In one example, the amount of exposure to replace the undesired or unwanted piping is typically no more than two times the width of the new section of piping.

The above method is efficient in time for removing and installing the adaptive tile coupling. The above method achieves a quality fit and is not disruptive to a much larger area beyond the piping to be removed. By limiting and reducing exposure to a larger area, the chances of piping buckling and collapsing is reduced. The inserting, placing and securing the adaptive tile coupling(s) may also be performed in the absence of tools or accessories in these methods.

The above methods described with existing piping may also be performed with new piping. With new piping, however, there would not be cutting and removal steps.

According to one method, a section of piping is replaced. The method includes cutting a section of existing piping and then removing the section of the existing piping such that the remaining piping has a first open end and a second open end. A first adaptive tile coupling and a second adaptive tile coupling are provided, such as discussed above. A new section of piping with a first end and a second end is provided. The male portion of the first adaptive tile coupling is inserted into the first open end of the existing piping. The new section of piping is placed into the female portion of the first adaptive tile coupling. The first adaptive tile coupling is secured to the new section piping including moving at least first and third sections of the female portion of the first adaptive tile coupling from an open position to a closed position to form a generally cylindrical shape. The male portion of the second adaptive tile coupling is inserted into the second open end of the existing piping. The new section of piping is placed into the female portion of the second adaptive tile coupling. The second adaptive tile coupling is secured to the new section piping including moving at least first and third sections of the female portion of the second adaptive tile coupling from an open position to a closed position to form a generally cylindrical shape. The generally cylindrical section of the male portion has a first diameter. The first, second and third sections of the female portion in the closed position have a second diameter in which the second diameter is larger than the first diameter.

According to another method, a section of piping is replaced. The method includes cutting a section of existing piping and then removing the section of the existing piping such that the remaining piping has a first open end and a second open end. A first adaptive tile coupling and a second adaptive tile coupling are provided, such as discussed above. A new section of piping with a first end and a second end is provided. The male portion of the first adaptive tile coupling is inserted into the first open end of the existing piping. The new section of piping is placed into the female portion of the first adaptive tile coupling. The first adaptive tile coupling is secured to the new section piping including moving at least one of the first and second sections of the female portion of the first adaptive tile coupling from an open position to a closed position to form a generally cylindrical shape. The male portion of the second adaptive tile coupling is inserted into the second open end of the existing piping. The new section of piping is placed into the female portion of the second adaptive tile coupling. The second adaptive tile coupling is secured to the new section of piping including moving at least one of the first and second of the female portion of the second adaptive tile coupling from an open position to a closed position to form a generally cylindrical shape. The generally cylindrical section of the male portion has a first diameter. The first and second sections of the female portion in the closed position have a second diameter in which the second diameter is larger than the first diameter.

Figure 9:
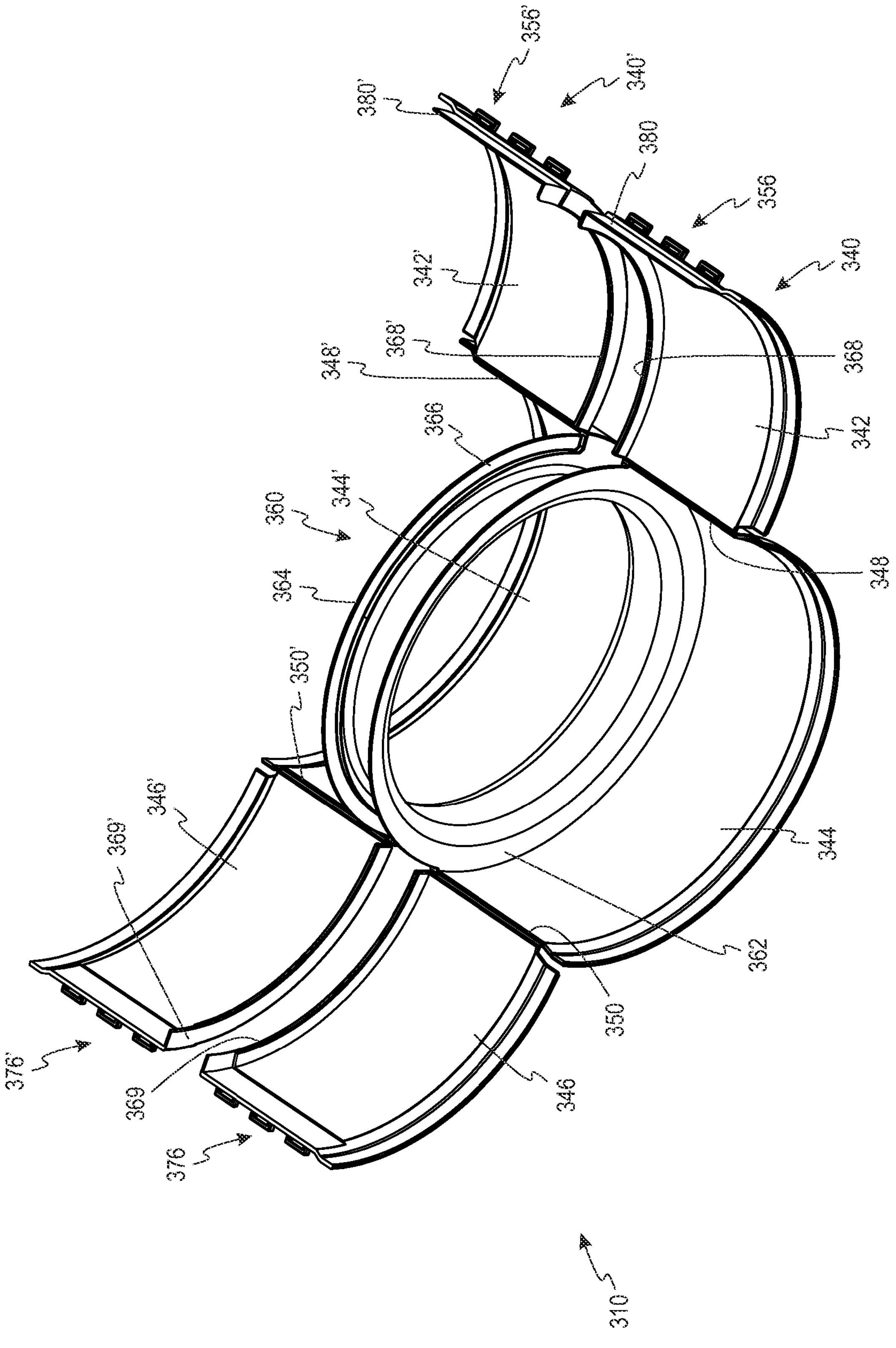
FIG. 9 is a front perspective view of an adaptive tile coupling in an open position according to a further embodiment.

It is contemplated that other embodiments may be used other than an adaptive tile coupling using female and male portion coupling. For example, referring to FIG. 9, an adaptive coupling 310 is shown. This particular configuration is an adaptive tile coupling for only external pipe coupling. The adaptive coupling 310 includes a first female portion 340, a second female portion 340', and a generally circular ring 360. The first female portion 340 includes a first section 342, a second section 344, and a third section 346. The second female portion 340' includes a first section 342', a second section 344', and a third section 346'. The first sections 342, 342' include respective fastening mechanisms 356, 356', and respective flaps 380, 380'. Similarly, the third sections 346, 346' include respective fastening mechanisms 376, 376'. The first and second female portions 340, 340' function the same as described above with the female portion 40.

The generally circular ring 360 includes a first outwardly extending flange 362 and a second outwardly extending flange 364. The first outwardly extending flange 362 and the second outwardly extending flange 364 being located at opposite ends of the generally circular ring 360. The first female portion 340 abuts the first outwardly extending flange 362 when the adaptive tile coupling is in a closed position. Specifically, sidewalls 368, 369 abut a recess (not shown in FIG. 9) formed in the first outwardly extending flange 362. Similarly, sidewalls 368', 369' abut a recess 366 formed in the second outwardly extending flange 364.

The adaptive tile coupling 310 function similarly as described above with the adaptive tile coupling 10 in the methods, except there is no male portion and both the female portions 340, 340' would surround the piping without an insertion of a portion of the adaptive coupling occurring. The piping would be abutted against the respective first and second outwardly extending flanges 362, 364.

It is contemplated that the adaptive tile coupling may include a tab or a single-raised lip protruding internally on the first and/or second female portions. The tabs may be similar to the upwardly extending tabs discussed above. The single-raised lip may be similar to the flap described above. The tab or the single-raised lip would assist in preventing or inhibiting movement with respect to the existing piping by lining up or fitting in grooves or valleys of existed corrugated piping. It also may be beneficial to have the ability to trim the tab or single-raised lip with a knife, for example, if the adaptive tile coupling is used with a solid clay or concrete piping without any grooves or valleys.

According to a further method, a section of piping is replaced. The method includes cutting a section of existing piping and then removing the section of the existing piping such that the remaining piping has a first open end and a second open end. A first adaptive tile coupling and a second adaptive tile coupling is provided, such as adaptive tile coupling 310. A new section of piping with a first end and a second end is provided. The first female portion of the first adaptive tile coupling is positioned such that the existing section of piping is placed into the first female portion of the first adaptive tile coupling. The new section of piping is placed into the second female portion of the first adaptive tile coupling. The first adaptive tile coupling is secured to the existing piping and the new section piping including moving the first and third sections of the first and second female portions of the first adaptive tile coupling from an open position to a closed position to form a generally cylindrical shape.

The first female portion of the second adaptive tile coupling is positioned such that the existing section of piping is placed into the first female portion of the second adaptive tile coupling. The new section of piping is placed into the second female portion of the second adaptive tile coupling. The second adaptive tile coupling is secured to the existing piping and the new section piping including moving the first and third sections of the first and second female portions of the first adaptive tile coupling from an open position to a closed position to form a generally cylindrical shape. The securing may be accomplished by using the fastener mechanisms described above.

It is contemplated that the above adaptive tile coupling 310 formed with three sections in both of the female portions 340, 340' may in another embodiment be formed with two sections. In such an embodiment, the adaptive tile coupling would function similarly as described above.

Figure 10A:
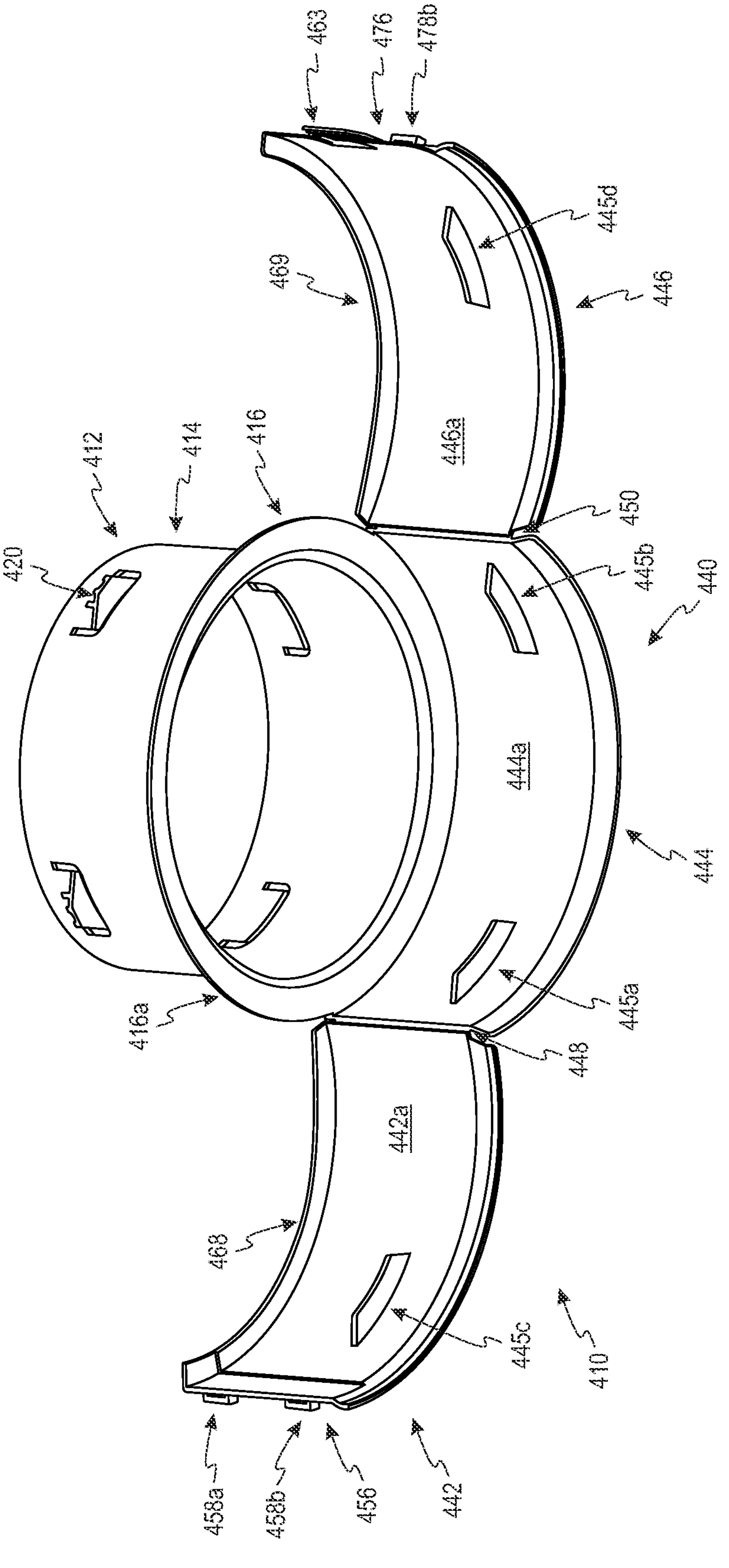
FIG. 10A is a front perspective view of an adaptive tile coupling in an open position according to a further embodiment.
Figure 10B:
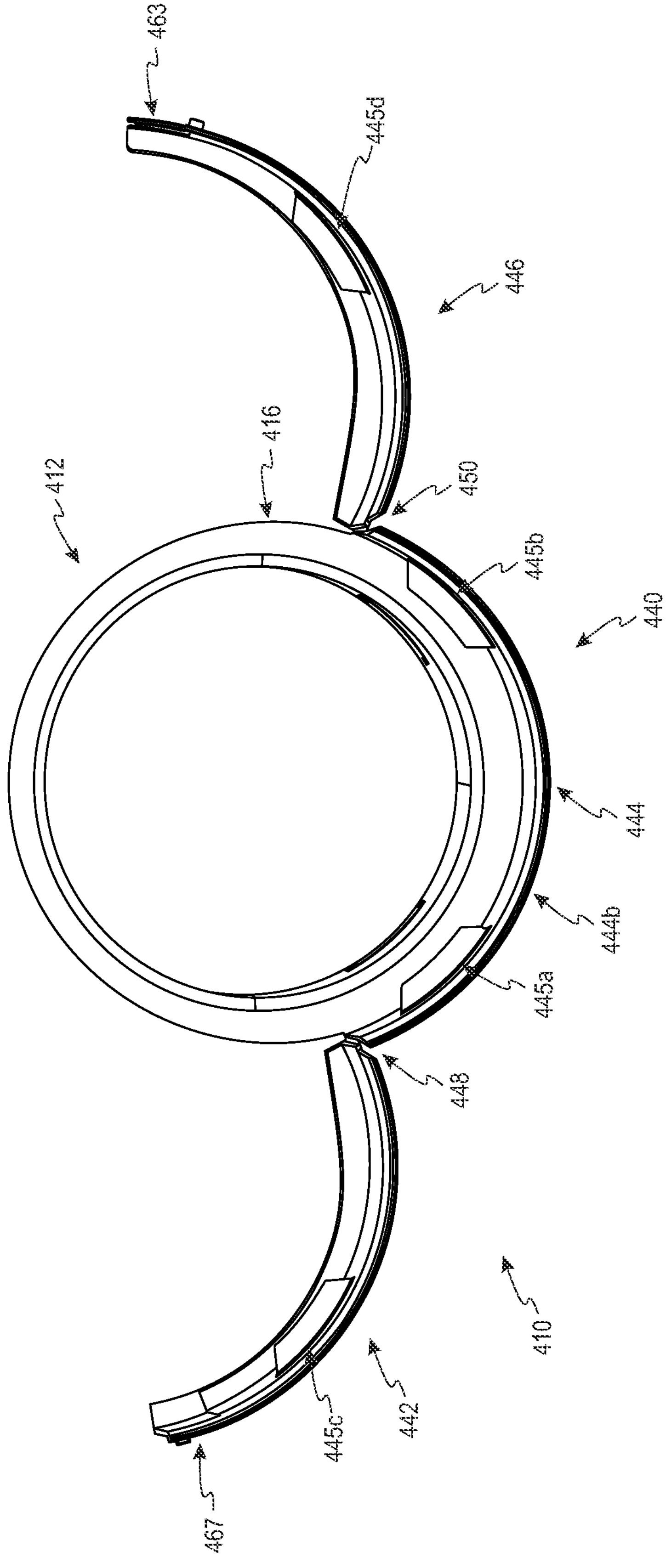
FIG. 10B is a front view of the adaptive tile coupling in an open position of FIG. 10A.

FIGS. 10A, 10B illustrate an adaptive tile coupling 410 according to a further embodiment. The adaptive tile coupling 410 is configured to assist in drainage systems like the adaptive tile couplings described above. The adaptive tile coupling 410 includes a male portion 412 and a female portion 440. This particular configuration is an adaptive tile coupling for internal and external pipe coupling. In this embodiment, the male portion 412 and the female portion 440 of the adaptive tile coupling 410 is a singular integrated modular fitting.

The male portion 412 includes a generally cylindrical section 414 and an outwardly extending flange 416 extending from the generally cylindrical section 414. The outwardly extending flange 416 extends generally perpendicular from the generally cylindrical section 414. The outwardly extending flange 416 extends completely around an end of the generally cylindrical section 414. It is contemplated that that outwardly extending flange may extend around less than the entire circumference of the end of the generally cylindrical section. The outwardly extending flange 416 forms a recess (not shown) that is similar or the same as the recess 22 in the adaptive tile coupling 10 described above. The recess extends along a portion of an exterior surface 416*a* of the outwardly extending flange 416. The recess assists in fitting with the female portion 440 when the adaptive tile coupling 410 is in the closed position.

The generally cylindrical section 414 forms a plurality of upwardly extending tabs 420. The plurality of upwardly extending tabs 420 extends from the remainder of the male portion 412. In this embodiment, there are exactly four upwardly extending tabs that are equally spaced around the generally cylindrical section 414 as shown in FIG. 10A. The plurality of upwardly extending tabs 420 functions in the same manner as the plurality of upwardly extending tabs 20 and may have the same dimensions as discussed above. The plurality of upwardly extending tabs 420 is formed in the same manner as the plurality of upwardly extending tabs 20.

The female portion 440 is attached to or integrally formed with the male portion 412. As shown best in FIGS. 10A, 10B, the female portion 440 includes a first section 442, a second section 444, and a third section 446. The first section 442 and the second section 444 are connected by a first hinge 448. The second section 444 and the third section 446 are connected by a second hinge 450. The first section 442 includes a sidewall 468, while the third section 446 includes a sidewall 469. The sidewalls 468, 469 are integrally formed with the respective first and third sections 442, 446. The sidewalls 468, 469 are generally perpendicular to the respective remainders of the first and third sections 442, 446. The sidewalls 468, 469 are shaped and sized to fit into the recess of the outwardly extending flange 416 when the adaptive tile coupling 410 is in a closed position.

The second section 444 includes an internal surface 444*a* and an external surface 444*b*. The internal surface 444*a* of the second section 444 is generally smooth or smooth in this embodiment, except for a plurality of raised ribs 445*a*, 445*b*. Similarly, the internal surface 442*a* of the first section 442 and the internal surface 446*a* of the third section 446 are generally smooth or smooth in this embodiment, except for a plurality of raised ribs 445*c*, 445*d*, respectively. It is contemplated that the internal surface may include at least one raised rib.

The plurality of raised ribs 445*a-d* assists in securing the piping into the female portion 440 in combination with the force of the tying mechanisms (e.g., zip ties) pulling the adaptive tile coupling tight around the piping. This is, for example, the same piping described above. In one embodiment, the spacing of the raised ribs 445*a*-445*d* is narrower than an average spacing of ribs of a corrugated pipe to leave room for slight in and out lateral movement of the piping inside of the adaptive tile coupling. It is contemplated that if the plurality of raised ribs does not align properly with the piping being installed, then the plurality of raised ribs can be easily removed without compromising the integrity of the overall fitting. For example, in one method, an installer may cut out the raised ribs with a utility knife or tool.

Figure 11A:
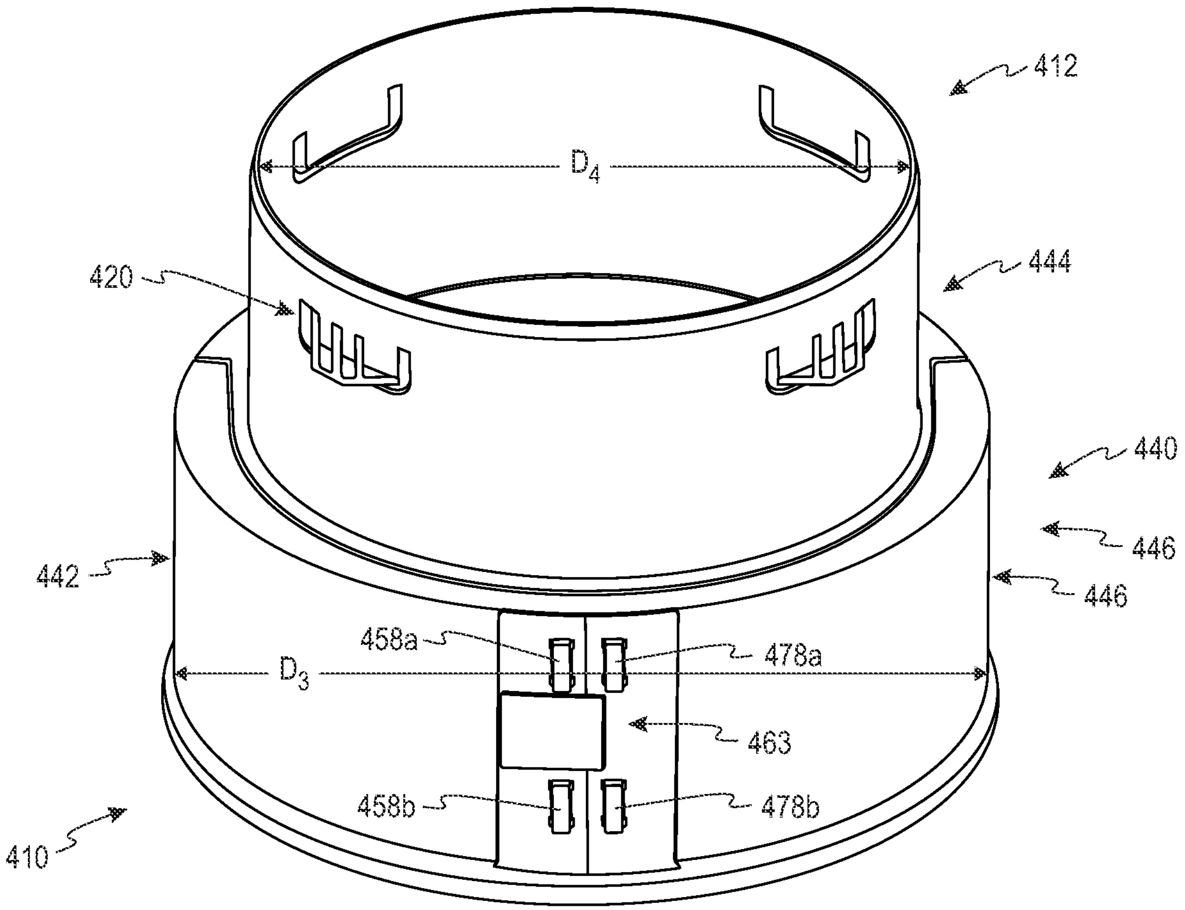
FIG. 11A is a side view of the adaptive tile coupling of FIG. 10A in a closed position.
Figure 11B:
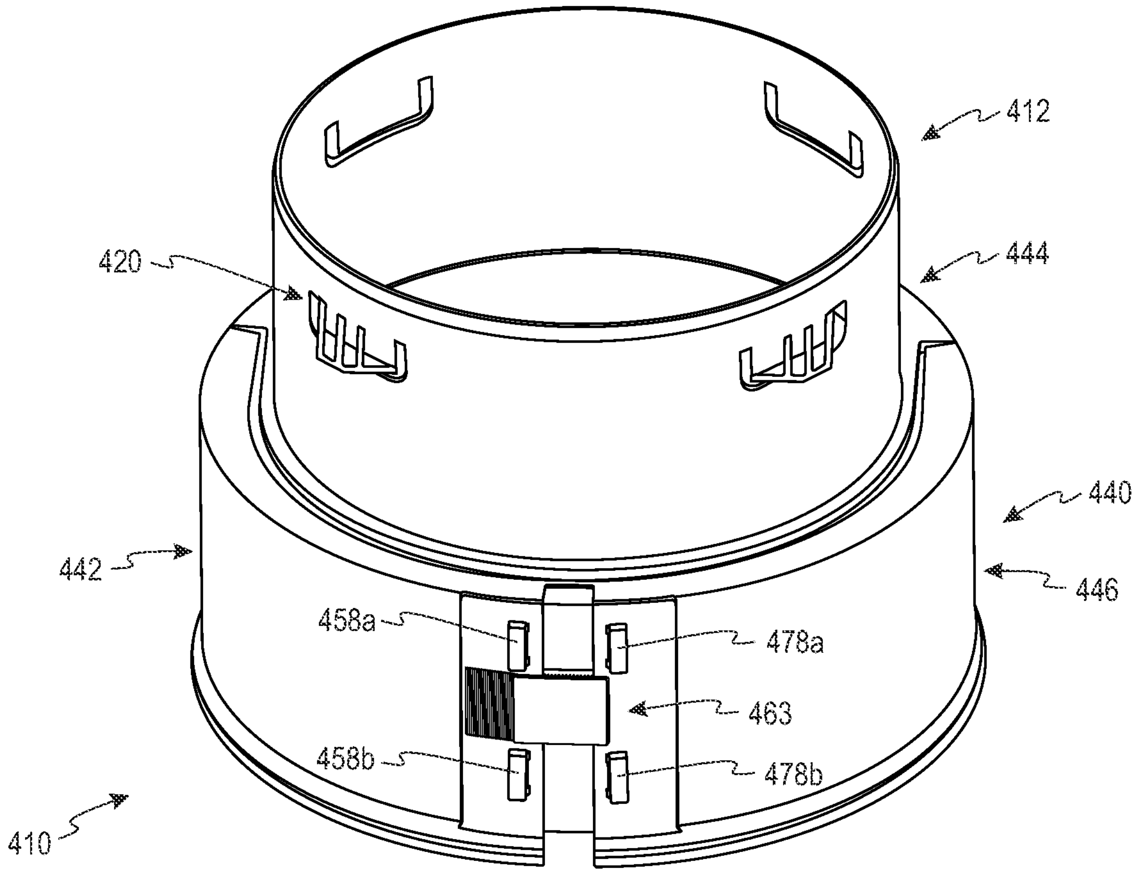
FIG. 11B is a side view of the adaptive tile coupling of FIG. 10A in another closed position.
Figure 11C:
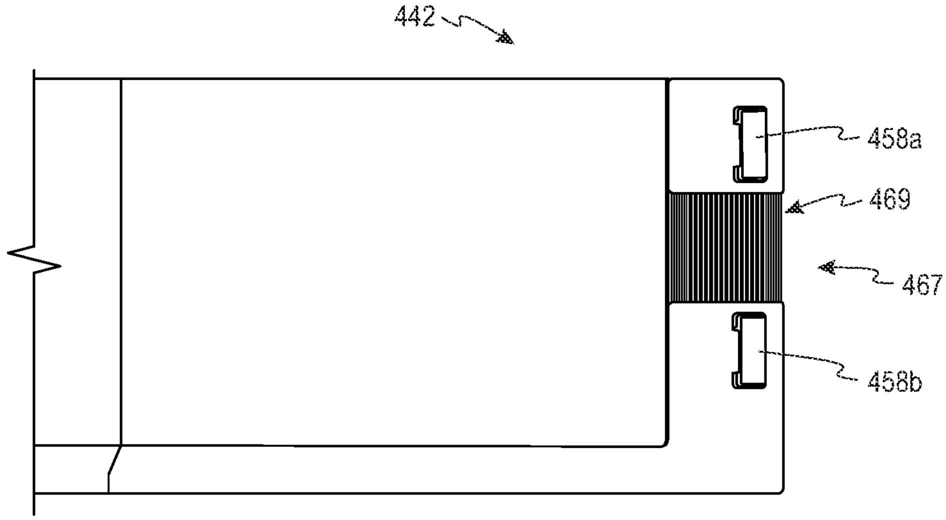
FIG. 11C is an enlarged side view of one portion of the female portion of FIG. 10A.

The first section 442 forms a fastening mechanism 456. The fastening mechanism 456 shown in FIG. 10A comprises a plurality of loops or bridges 458*a*, 458*b*. The loops 458*a*, 458*b* function the same as the loops or bridges 58*a*-58*c* discussed above. The loops 458*a*, 458*b* are generally rigid. As discussed above, the loops or bridges 458*a*, 458*b* assist in securing the female portion 440 in a closed position (see the adaptive tile coupling 410 in FIGS. 11A, 11B). An enlarged view of the same is shown in FIG. 11C.

Figure 11D:
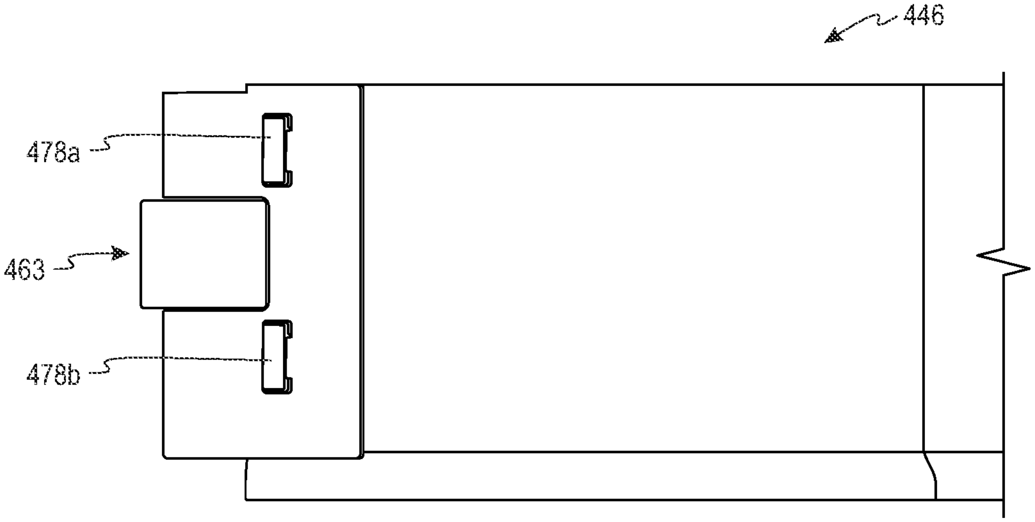
FIG. 11D is an enlarged side view of another portion of the female portion of FIG. 10A.

Similarly, the third section 446 forms a fastening mechanism 476. The fastening mechanism 476 shown in FIGS. 10A, 10B comprises a plurality of loops or bridges 478*a*, 478*b*. An enlarged view of the same is shown in FIG. 11D. The plurality of loops or bridges function in the same manner as discussed above. It is contemplated that the loops in the third section may be different than those in the first section.

It is contemplated that the loops may be shaped and sized differently than shown in the loops 458*a*, 458*b* and 478*a*, 478*b* as long as they can perform the same functionality as those loops discussed above. For example, the loops may be an arched bridge such, as for example, a smooth semi-circle. It is contemplated that loops or bridges may be other polygonal or non-polygonal shapes that form an opening therethrough.

The first and third sections 442, 446 of the female portion 440 are configured to move from an open position (see, e.g., FIGS. 10A, 10B) to closed positions (see FIGS. 11A, 111B) to form a generally cylindrical shape. It is contemplated that exactly one of the sections may be configured to move in other embodiments to form a generally cylindrical shape. The fastening mechanism 456 of the first section 442 and the fastening mechanism 476 of the third section 446 assist in securing and maintaining the female portion 440 in a closed position. Referring back to FIG. 11A, the first, second and third sections of 442, 444 and 446 of the female portion 440 in the closed position has a first diameter D3. The second diameter D3 of the female portion 440 is larger than a first diameter D4 of the male portion 412.

The third section 446 of the female portion 440 includes an adjustable latch 463. This is shown in detail in FIGS. 11D, 11E, 11G. The adjustable latch 463 assists in adjusting for different sized outside diameter pipes. For example, the closed position of the female portion 440 is larger in FIG. 11B than FIG. 11A to accommodate a larger outside diameter pipe. FIG. 11A is shown in the fully closed position. The functionality of the adjustable latch 463 is to assist in surrounding piping that may vary a bit (e.g., varying outside diameters of same trade sized piping) between manufacturers or products.

Figure 11E:
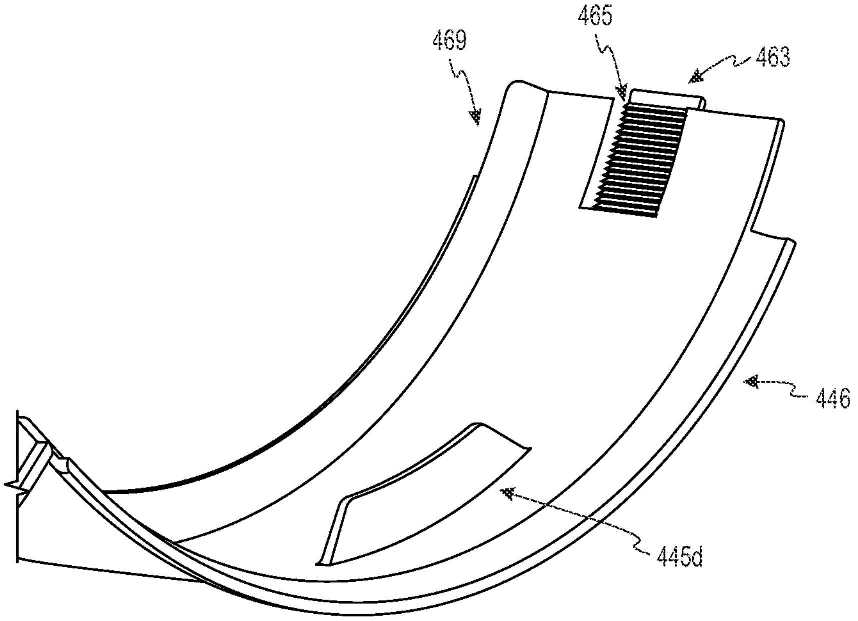
FIG. 11E is an enlarged interior perspective view of one portion of the female portion of FIG. 10A.
Figure 11F:
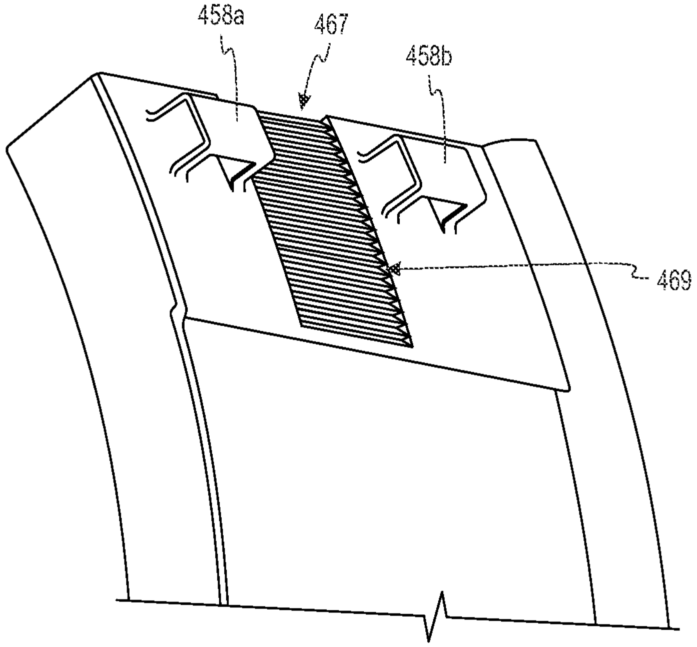
FIG. 11F is an enlarged exterior perspective view of another portion of the female portion of FIG. 10A.
Figure 11G:
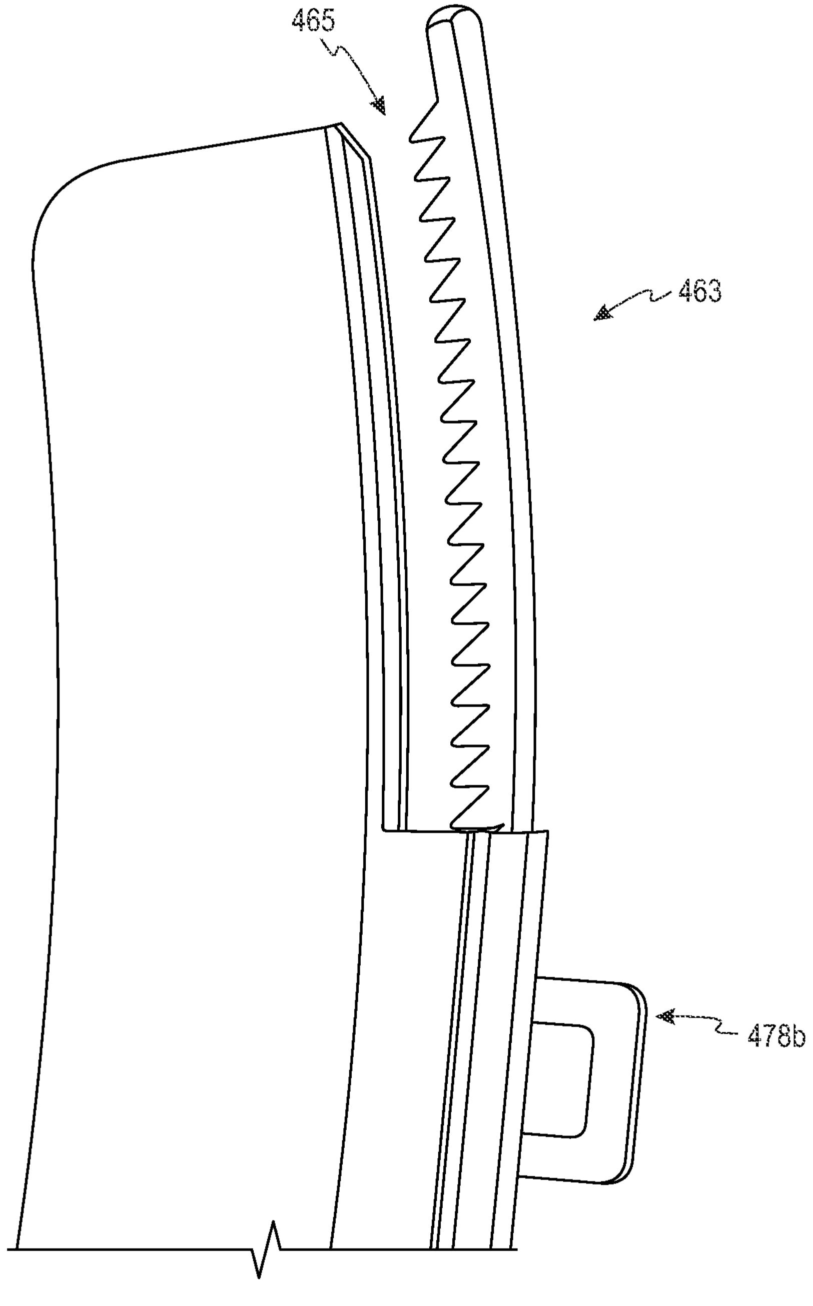
FIG. 11G is an enlarged side view of one portion of the female portion of FIG. 10A.
Figure 11H:
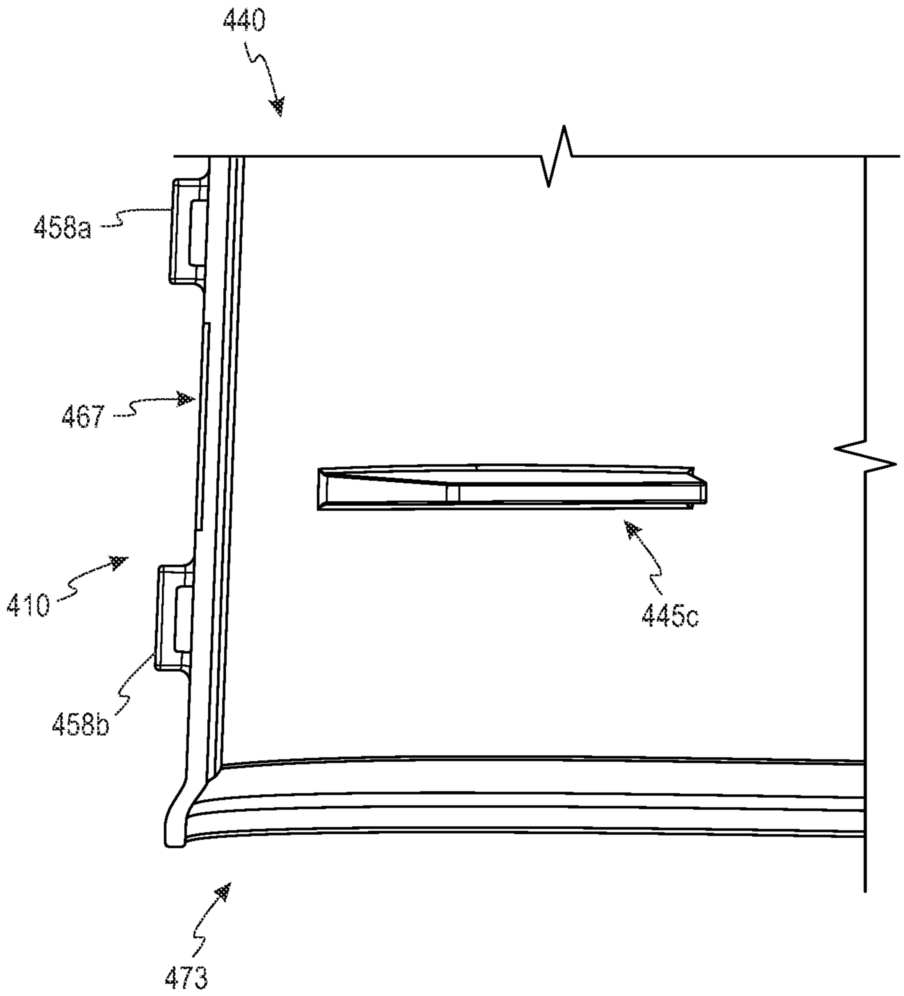
FIG. 11H is an enlarged interior perspective view of one portion of the female portion of FIG. 10A.
Figure 12:
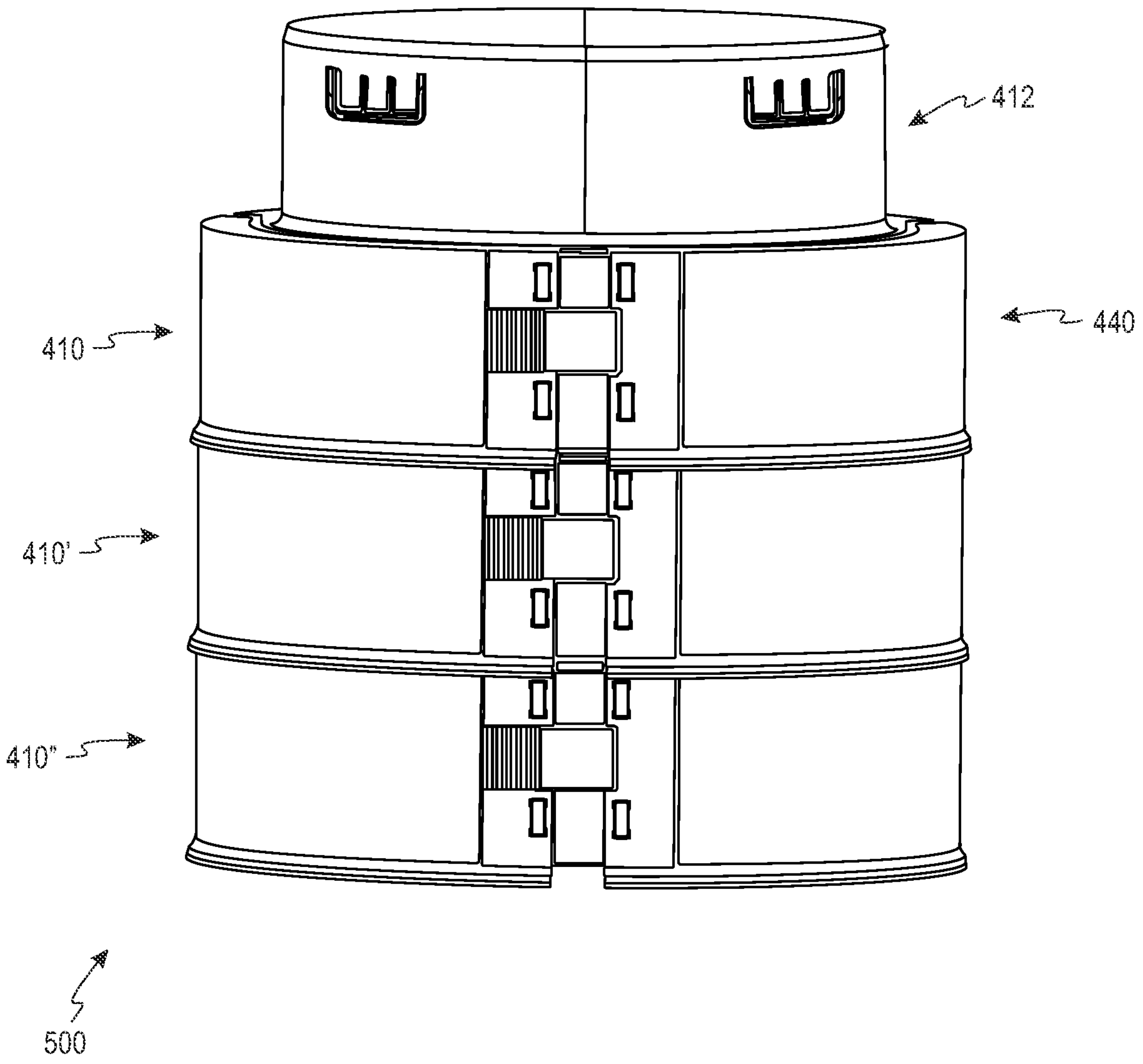
FIG. 12 is a side view of a plurality of stacked adaptive tile couplings of FIG. 10A in a closed position in one embodiment.

Referring to FIGS. 11E, 11G, the adjustable latch 463 includes a plurality of saw-toothed teeth 465. The saw-tooth teeth 465 of the adjustable latch 463 is sized and configured to be received into corresponding saw-tooth teeth 469 of the latch-receiving area 467 (FIG. 11F). The adjustable latch 463 assists in shipping, storage and installation of attaching with piping. The adjustable latch 463 will hold the adaptive tile coupling 410 in a closed position during shipping. This is shown with a plurality of adaptive tile coupling in a stacking configuration 500 of FIG. 12 that includes the adaptive tile coupling 410, the adaptive tile coupling 410' and the adaptive tile coupling 410". Each of the adaptive tile coupling 410, the adaptive tile coupling 410' and the adaptive tile coupling 410" is in a closed position using the adjustable latch and latch-receiving area. This stacking configuration 500 can be used in both shipping and storage. The adaptive tile coupling 410 includes a lip 473 (FIG. 11H)

on an edge of the female portion 440. The lip 473 is offset, which assists in increasing the rigidness of the outside walls of the adaptive tile couplings. This increased rigidness and the offset configuration assists in aligning and stacking the adaptive tile coupling. Specifically, the offset configuration assists in interlocking the vertical stack of adaptive tile couplings. This stacking is completed as shown in FIG. 12 without using any tying mechanisms (e.g., zip ties).

During installation, the adjustable latch 463 assists in holding the adaptive tile coupling 410 in a closed position, which enables an installer to insert tying mechanisms to fully tighten and secure the adaptive tile coupling to the piping for burial in the ground. The adjustable latch 463 also assists in preventing or inhibiting dirt from entering into an interior of the adaptive tile coupling 410 when in a closed position.

It is contemplated that instead of the three sections of the female portion 440 of the adaptive tile coupling 410 shown in the embodiment of FIGS. 10A, 10B, more or less sections may be used in forming the female section.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

What is claimed is:

1. An adaptive tile coupling comprising:

a male portion including a generally cylindrical section and an outwardly extending flange extending from the generally cylindrical section; and a female portion being attached to or integrally formed with the male portion, the female portion including at least a first section, a second section and a third section, the first section and the second section being connected by a first hinge, the second section and the third section being connected by a second hinge, the first section having at least one fastening mechanism, the third section having at least one fastening mechanism, wherein at least one of the first and third sections of the female portion are configured to move from an open position to a closed position to form a generally cylindrical shape, the at least one fastening mechanism of the first section and the at least one fastening mechanism of the third section assist in securing and maintaining the female portion in a closed position, wherein the generally cylindrical section of the male portion has a first diameter, and the first, second and third sections of the female portion in the closed position has a second diameter, the second diameter being larger than the first diameter, wherein an edge of the female portion includes an offset lip extending radially outward and downwardly in a direction away from the male portion so as to form a cavity-receiving area to assist in receiving, aligning and stacking the adaptive tile coupling, wherein the at least one fastening mechanism of the first section is a loop and the at least one fastening mechanism of the third section is a loop, each of the loops forming an opening.

2. The adaptive tile coupling of claim 1, wherein one of the first, second and third portions of the female portion includes an adjustable latch to assist in holding the adaptive tile coupling in the closed position.

3. An adaptive tile coupling comprising:

a male portion including a generally cylindrical section and an outwardly extending flange extending from the generally cylindrical section; and a female portion being attached to or integrally formed with the male portion, the female portion including at least a first section, a second section and a third section, the first section and the second section being connected by a first hinge, the second section and the third section being connected by a second hinge, the first section having at least one fastening mechanism, the third section having at least one fastening mechanism, wherein at least one of the first and third sections of the female portion are configured to move from an open position to a closed position to form a generally cylindrical shape, the at least one fastening mechanism of the first section and the at least one fastening mechanism of the third section assist in securing and maintaining the female portion in a closed position, wherein the generally cylindrical section of the male portion has a first diameter, and the first, second and third sections of the female portion in the closed position has a second diameter, the second diameter being larger than the first diameter, wherein an edge of the female portion includes an offset lip extending radially outward and downwardly in a direction away from the male portion so as to form a cavity-receiving area to assist in receiving, aligning and stacking the adaptive tile coupling, wherein the outwardly extending flange includes a recess formed therein, the recess assisting in fitting with the female portion when the adaptive tile coupling is in the closed position.

4. An adaptive tile coupling comprising:

a male portion including a generally cylindrical section and an outwardly extending flange extending from the generally cylindrical section; and a female portion being attached to or integrally formed with the male portion, the female portion including at least a first section, a second section and a third section, the first section and the second section being connected by a first hinge, the second section and the third section being connected by a second hinge, the first section having at least one fastening mechanism, the third section having at least one fastening mechanism, wherein at least one of the first and third sections of the female portion are configured to move from an open position to a closed position to form a generally cylindrical shape, the at least one fastening mechanism of the first section and the at least one fastening mechanism of the third section assist in securing and maintaining the female portion in a closed position, wherein the generally cylindrical section of the male portion has a first diameter, and the first, second and third sections of the female portion in the closed position has a second diameter, the second diameter being larger than the first diameter, wherein an edge of the female portion includes an offset lip extending radially outward and downwardly in a direction away from the male portion so as to form a cavity-receiving area to assist in receiving, aligning and stacking the adaptive tile coupling, wherein the generally cylindrical section forms a plurality of upwardly extending tabs, the plurality of upwardly extending tabs being configured to assist in securing the adaptive tile coupling during installation.

5. An adaptive tile coupling comprising:

a male portion including a generally cylindrical section and an outwardly extending flange extending from the generally cylindrical section; and a female portion being attached to or integrally formed with the male portion, the female portion including at least a first section, a second section and a third section, the first section and the second section being connected by a first hinge, the second section and the third section being connected by a second hinge, the first section having at least one fastening mechanism, the third section having at least one fastening mechanism, wherein at least one of the first and third sections of the female portion are configured to move from an open position to a closed position to form a generally cylindrical shape, the at least one fastening mechanism of the first section and the at least one fastening mechanism of the third section assist in securing and maintaining the female portion in a closed position, wherein the generally cylindrical section of the male portion has a first diameter, and the first, second and third sections of the female portion in the closed position has a second diameter, the second diameter being larger than the first diameter, wherein an edge of the female portion includes an offset lip extending radially outward and downwardly in a direction away from the male portion so as to form a cavity-receiving area to assist in receiving, aligning and stacking the adaptive tile coupling, wherein the second section has an internal surface and an external surface, the internal surface of the second section being generally smooth, the internal surface further includes at least one raised rib.

6. An adaptive tile coupling comprising:

a male portion including a generally cylindrical section and an outwardly extending flange extending from the generally cylindrical section; and a female portion being attached to or integrally formed with the male portion, the female portion including at least a first section, a second section and a third section, the first section and the second section being connected by a first hinge, the second section and the third section being connected by a second hinge, the first section having at least one fastening mechanism, the third section having at least one fastening mechanism, wherein at least one of the first and third sections of the female portion are configured to move from an open position to a closed position to form a generally cylindrical shape, the at least one fastening mechanism of the first section and the at least one fastening mechanism of the third section assist in securing and maintaining the female portion in a closed position, wherein the generally cylindrical section of the male portion has a first diameter, and the first, second and third sections of the female portion in the closed position has a second diameter, the second diameter being larger than the first diameter, wherein an edge of the female portion includes an offset lip extending radially outward and downwardly in a direction away from the male portion so as to form a cavity-receiving area to assist in receiving, aligning and stacking the adaptive tile coupling, wherein the first section of the female portion includes a flap, wherein the third section of the female portion forms a recess therein, the recess being configured to receive the flap.

* * * * *